United States Patent
Tanabe et al.

(10) Patent No.: US 8,275,758 B2
(45) Date of Patent: Sep. 25, 2012

(54) SEARCH SYSTEM OF COMMUNICATIONS DEVICE

(75) Inventors: Akimichi Tanabe, Kawasaki (JP); Motoshi Tamura, Zushi (JP); Atsushi Iwasaki, Yokosuka (JP); Makoto Koushiro, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1361 days.

(21) Appl. No.: 11/721,314

(22) PCT Filed: May 12, 2006

(86) PCT No.: PCT/JP2006/309581
§ 371 (c)(1),
(2), (4) Date: Jun. 8, 2007

(87) PCT Pub. No.: WO2006/121161
PCT Pub. Date: Nov. 16, 2006

(65) Prior Publication Data
US 2010/0274805 A9     Oct. 28, 2010

(30) Foreign Application Priority Data
May 12, 2005   (JP) .................................. 2005-140128

(51) Int. Cl.
*G06F 17/30* (2006.01)
(52) U.S. Cl. ........................................ 707/706; 707/770
(58) Field of Classification Search .................. 707/694, 707/705, 706, 736, 758, 790, 793, 802, 821, 707/822
See application file for complete search history.

(56) References Cited

U.S. PATENT DOCUMENTS

| | | | |
|---|---|---|---|
| 5,635,907 A * | 6/1997 | Bernard et al. ............. | 340/573.4 |
| 6,333,690 B1 | 12/2001 | Nelson et al. | |
| 7,043,225 B1 * | 5/2006 | Patel et al. ..................... | 455/405 |
| 7,142,120 B2 * | 11/2006 | Charych et al. ............ | 340/572.4 |
| 7,183,923 B2 * | 2/2007 | Sasaki et al. ............... | 340/572.1 |
| 7,209,756 B2 * | 4/2007 | Yabe et al. .................. | 455/456.3 |
| 7,248,160 B2 * | 7/2007 | Mangan et al. ........... | 340/539.13 |
| 7,464,094 B2 * | 12/2008 | Sullivan et al. ....................... | 1/1 |

(Continued)

FOREIGN PATENT DOCUMENTS

EP   1431941 A2   6/2004

(Continued)

OTHER PUBLICATIONS

Notification of Reasons for Rejection, as issued in Japanese Patent Application No. 2007-528341, mailed by the Japanese Patent Office on Sep. 15, 2009, Mailing No. 613117.

(Continued)

*Primary Examiner* — Cam-Linh Nguyen
(74) *Attorney, Agent, or Firm* — Workman Nydegger

(57) ABSTRACT

A communications system is provided which can search for information about a communications device that is not registered in a network by designating time. The search system, which includes a plurality of communications devices, gateways and an entity management server, can execute a search method. The entity management server stores in a storage device the identification information of the communications device sent from the gateways with establishing correspondence with notification time. The entity management server receives from a mobile terminal the identification information of the communications device and designated time. The entity management server searches for the identification information stored in the storage device at the designated time, and identifies the location information of the gateways corresponding to the identification information included in the search request.

13 Claims, 20 Drawing Sheets

U.S. PATENT DOCUMENTS

| | | | |
|---|---|---|---|
| 7,515,990 B2 | 4/2009 | Sato et al. | |
| 7,558,584 B2 * | 7/2009 | Yamamoto et al. | 455/456.5 |
| 2002/0177451 A1 * | 11/2002 | Ogasawara | 455/456 |
| 2004/0138918 A1 * | 7/2004 | Fujimoto | 705/1 |
| 2005/0026630 A1 * | 2/2005 | Iso et al. | 455/456.3 |
| 2005/0027828 A1 * | 2/2005 | Yamazaki | 709/219 |
| 2005/0086264 A1 * | 4/2005 | Masuda | 707/104.1 |
| 2005/0272413 A1 * | 12/2005 | Bourne | 455/415 |
| 2005/0285742 A1 * | 12/2005 | Charych et al. | 340/572.1 |
| 2006/0020513 A1 * | 1/2006 | Nagano et al. | 705/14 |
| 2006/0049944 A1 * | 3/2006 | Ishiguro et al. | 340/572.1 |
| 2006/0098627 A1 * | 5/2006 | Karaoguz et al. | 370/352 |
| 2006/0145815 A1 * | 7/2006 | Lanzieri et al. | 340/10.2 |
| 2006/0238347 A1 * | 10/2006 | Parkinson et al. | 340/572.4 |
| 2007/0029381 A1 * | 2/2007 | Braiman | 235/385 |
| 2009/0319503 A1 * | 12/2009 | Mehul et al. | 707/5 |
| 2010/0125570 A1 * | 5/2010 | Chapelle et al. | 707/722 |
| 2010/0223258 A1 * | 9/2010 | Ghahramani et al. | 707/723 |
| 2011/0080262 A1 * | 4/2011 | Richardson et al. | 340/8.1 |

FOREIGN PATENT DOCUMENTS

| | | |
|---|---|---|
| JP | 2000-156883 | 6/2000 |
| JP | 2000-259995 | 9/2000 |
| JP | 2000-324539 | 11/2000 |
| JP | 2001-077929 | 3/2001 |
| JP | 2001-353850 | 12/2001 |
| JP | 2002-060018 | 2/2002 |
| JP | 2002-092287 | 3/2002 |
| JP | 2002-131065 | 5/2002 |
| JP | 2002-218559 | 8/2002 |
| JP | 2003-222525 | 8/2003 |
| JP | 2003-262534 | 9/2003 |
| JP | 2003-272082 | 9/2003 |
| JP | 2004-015117 | 1/2004 |
| JP | 2004-132732 | 4/2004 |
| JP | 2004-208101 | 7/2004 |
| JP | 2004-252964 | 9/2004 |
| JP | 2004-266630 | 9/2004 |
| JP | 2004-280350 | 10/2004 |
| JP | 2004-318483 | 11/2004 |
| JP | 2004-328018 | 11/2004 |
| JP | 2004-345784 | 12/2004 |
| JP | 2005-012597 | 1/2005 |
| JP | 2005-027275 | 1/2005 |
| JP | 2005-056177 | 3/2005 |
| JP | 2005-070863 | 3/2005 |
| WO | 2004/103864 | 12/2004 |

OTHER PUBLICATIONS

Decision of Refusal, as issued in Japanese Patent Application No. 2007-528341, mailed by the Japanese Patent Office on Mar. 30, 2010, Mailing No. 211533.

Letter of Questioning from the Appeal Board of JPO, May 10, 2011, 11 pages.

International Search Report from International Application No. PCT/JP2006/309581 filed May 12, 2006, dated Aug. 15, 2006.

Extended European Search Report, Application No. 06732562.1-1244/1881712, PCT JP2006309581, NTT DoCoMo, Inc.

Trial Decision, Dec. 27, 2012 (Mailing Date Jan. 10, 2012), Appeal No. 2010-12049 Demandant: NTT DoCoMo, Inc.

* cited by examiner

| SERVICE ID | ATTRIBUTES |
|---|---|
| IDs1 | THERMOMETER |
| IDs1 | HYGROMETER |
| IDs1 | RAINFALL METER |
| IDs2 | PRINTER |
| IDs3 | VIDEO CAMERA |
| IDs3 | CAMERA |
| ⋮ | ⋮ |

FIG.8

| SERVICE ID | NECESSARY INFORMATION | ATTRIBUTE INFORMATION |
|---|---|---|
| IDd1: WEATHER INFORMATION SERVICE (INCLUDING NATURAL DISASTERS) | TEMPERATURE | THERMOMETER |
| | HUMIDITY | HYGROMETER |
| | RAINFALL | RAINFALL METER |
| | AIR CONTAMINATION LEVEL | AIR SENSOR |
| | TIDE LEVEL | TIDE GAUGE |
| | EARTHQUAKE | SEISMOMETER |
| IDd2: TRAFFIC INFORMATION SERVICE | SPEED | SPEED SENSOR |
| | VEHICLE DENSITY | VARIOUS SENSORS |
| IDd3: HOME SERVICE (HOME CONDITION MONITORING) | OPERATION STATE OF ELECTRIC EQUIPMENT | ELECTRIC EQUIPMENT |
| | CONDITION OF USING ELECTRICITY | ELECTRICITY METER |
| | CONDITION OF USING GAS | GAS METER |
| | LOCKING STATE | DOOR SENSORS |
| | ROOM CONDITIONS | SURVEILLANCE CAMERA |
| IDd4: TELEMETRY SERVICE (1) (CONDITION MONITORING/ REPAIRING OF EQUIPMENT) | CONDITION OF USING ELECTRICITY | ELECTRIC EQUIPMENT |
| IDd5: TELEMETRY SERVICE (2) (INVENTORY CONTROL OF VENDING MACHINE) | INVENTORY STATE OF VENDING MACHINE | VENDING MACHINE |

FIG.16

| TIME | ENTITY ID | GATEWAY ID | LOCATION |
|---|---|---|---|
| T1 | IDd1 | IDg1 | a11 |
| T1 | IDd2 | IDg1 | a11 |
| T1 | IDd3 | IDg2 | a14 |
| T2 | IDd1 | IDg1 | a11 |
| T2 | IDd3 | IDg2 | a13 |

FIG.19

| ENTITY CLASSIFICATION | | | ENTITY DESIGNATING METHOD | NW SIDE (CYBER) | | | LOCAL (REAL WORLD) | |
|---|---|---|---|---|---|---|---|---|
| | | | | ADDRESS | COMMUNICATION PROTOCOL | GW | COMMUNICATION PROTOCOL | ID |
| HAVING COMMUNICATIONS CAPABILITY | LOCAL MACHINERY | HOME INFORMATION APPLIANCES | LIVING/ENVIRONMENT EQUIPMENT | ID ATTRIBUTES | IP ADDRESS IP | | HOME GW | ECHONET | ECHONET ADDRESS |
| | | | AV EQUIPMENT ATTRIBUTES | ID ATTRIBUTES | | | | HAVi | IEEE1394 ADDRESS |
| WITHOUT COMMUNICATIONS CAPABILITY | TAG-ATTACHED ENTITY | WRITE TAG | | ID ATTRIBUTES | IP ADDRESS IP | | RF TAG READER | COMMUNICATIONS SYSTEM USING ELECTROMAGNETIC INDUCTION OR MICROWAVES | TAG-ID (EPC, ucode) |
| | | READ TAG | | | | | | | |
| | ENVIRONMENT | MEASURING SENSORS (POSITION, TEMPERATURE, SPEED ETC.) | | ID ATTRIBUTES | IP ADDRESS IP | | SENSOR HOST | LOCAL COMMUNICATIONS SYSTEM (WIRED/WIRELESS) | SENSOR ID |

FIG.20

SEARCH SYSTEM OF COMMUNICATIONS DEVICE

TECHNICAL FIELD

The present invention relates to a search system of a communications device, and more particularly to a search system and method of a communications device, a control server of the communications device, information search system and method, and computer program for searching for articles or information in response to a service request from a user.

BACKGROUND ART

In an existing communications system, terminals have communication functions and a protocol adapted to the network, and carry out communication by connecting to the network using them.

In a typical communications method, a sending terminal makes transmission by using a mobile phone number (or mail address), and is connected through a home location register (HLR) that resolves the location information about the terminal.

In a service using such a communications system, a user designates a communication party terminal and connects up to the party terminal. After completing the connection, the user requests a desired service to be offered from the party terminal. Subsequently, it can receive the service from the party terminal. As for such a method, when the user cannot identify the party terminal, the user cannot receive the services offered.

Recently, systems are proposed which can solve such a problem, and implement a computing environment the user can use without being conscious of the location or existence. Such systems enable the communication without being conscious of the protocol in a variety of communications devices (see, Patent Documents 1 and 2, for example).

As specific services, a technique is disclosed in which a user who lost the article, to which a data tag capable of communicating with an observation apparatus is attached, transmits information about the article to be searched for to a server using a terminal. The server carries out communication with the data tag through a plurality of observation devices (see Patent Document 3, for example).

The conventional search systems, however, cannot track the object of search in terms of time.

In addition, in the conventional search systems, the range of the search is restricted by the protocol to which the gateway conforms or within an area communicable through the gateway. Accordingly, it is not rare for the conventional search system to be unable to search for the object of search even if the object is present near the observation apparatus.

Furthermore, the conventional search system cannot conduct the search when the user side does not know the identification information about the object of search. Accordingly, it has a problem of being unable to search for a specific type of articles or information such as searching for a printer nearby.

Patent Document 1: Japanese patent application laid-open No. 2004-208101. Patent Document 2: Japanese patent application laid-open No. 2004-280350. Patent Document 3: Japanese patent application laid-open No. 2004-132732.

DISCLOSURE OF THE INVENTION

The present invention provides a search system capable of searching for an article designated by time.

In addition, the present invention provides a search system capable of searching for a greater number of target objects by increasing an observable target range.

Furthermore, the present invention provides a search system capable of carrying out a search by designating the type and attribute of a search target.

According to a first aspect of the present invention, the search system of the communications device is a search system having a plurality of gateways connected to the communications device, and a control server of the communications device, the control server comprising: memory control means for storing identification information of the communications device sent from the gateways in a storage device at every notification time with establishing correspondence with location information of the gateways that send the identification information; search request receiving means for receiving a search request including the identification information of the communications device and a designated time; and search means for retrieving the location information of the gateways to which the communications device corresponding to the search request is connected by searching for the identification information at the designated time stored in the storage device in response to reception of the search request.

Thus, the control server stores identification information of the communications device sent from the gateways in the storage device at every notification time with establishing correspondence with location information of the gateways that send the identification information; receives the search request including the identification information of the communications device and the designated time; and retrieves the location information of the gateways to which the communications device corresponding to the search request is connected by searching, in response to reception of the search request, for the identification information at the designated time stored in the storage device. Therefore it can provide the notification of the past and present locations of the search target.

According to a second aspect of the present invention, the control server of the communications device in accordance with the present invention comprises: memory control means for storing identification information of the communications device sent from a plurality of gateways connected to the communications device in a storage device at every notification time with establishing correspondence with location information of the gateways; search request receiving means for receiving a search request including the identification information of the communications device and a designated time; and search means for retrieving the location information of the gateways to which the communications device corresponding to the search request is connected by searching, in response to reception of the search request, for the identification information at the designated time stored in the storage device.

Thus, it stores identification information of the communications device sent from the plurality of gateways connected to the communications device in the storage device at every notification time with establishing correspondence with location information of the gateways; receives the search request including the identification information of the communications device and the designated time; and retrieves the location information of the gateways to which the communications device corresponding to the search request is connected by searching, in response to reception of the search request, for the identification information at the designated time stored in the storage device. Therefore it can provide the notification of the past and present locations of the search target.

Here, the search means can include notification request means for requesting the gateways to provide notification of the identification information of the communications device connected to the gateways at the designated time received.

Thus, it requests the gateways to provide notification of the identification information of the communications device connected to the gateways at the designated time received. Therefore it can provide the notification of the location of the search target at any desired future point.

Here, the search request of the communications device can include information about a geographical area, and the notification request means can request the gateways in the geographical area to provide notification of the identification information of the communications device.

Thus, the search request of the communications device includes information about the geographical area, and the gateways in the geographical area is requested to provide notification of the identification information of the communications device. Therefore, it can narrow the search processing down to a specified geographical area, and reduce the load imposed on the network side by the search processing.

According to a third aspect of the present invention, the search method of the communications device in accordance with the present invention is a search method of the communications device in a control server of the communications device, the search method comprising: a step of storing identification information of the communications device sent from a plurality of gateways connected to the communications device in a storage device at every notification time with establishing correspondence with location information of the gateways; a step of receiving a search request including the identification information of the communications device and a designated time; and a step of retrieving the location information of the gateways to which the communications device corresponding to the search request is connected by searching, in response to reception of the search request, for the identification information at the designated time stored in the storage device.

Thus, it stores the identification information of the communications device sent from the plurality of gateways connected to the communications device in the storage device at every notification time with establishing correspondence with location information of the gateways; receives the search request including the identification information of the communications device and the designated time; and retrieves the location information of the gateways to which the communications device corresponding to the search request is connected by searching, in response to the reception of the search request, for the identification information at the designated time stored in the storage device. Therefore it can provide the notification of the past and present locations of the search target.

According to a fourth aspect of the present invention, a computer program in accordance with the present invention causes a computer to function as: memory control means for storing identification information of the communications device sent from a plurality of gateways connected to the communications device in a storage device at every notification time with establishing correspondence with location information of the gateways; search request receiving means for receiving a search request including the identification information of the communications device and a designated time; and search means for retrieving the location information of the gateways to which the communications device corresponding to the search request is connected by searching, in response to reception of the search request, for the identification information at the designated time stored in the storage device.

Thus, it causes the computer to function in such a manner as: to store identification information of the communications device sent from the plurality of gateways connected to the communications device in the storage device at every notification time with establishing correspondence with location information of the gateways; to receive the search request including the identification information of the communications device and the designated time; and to retrieve the location information of the gateways to which the communications device corresponding to the search request is connected by searching, in response to the reception of the search request, for the identification information at the designated time stored in the storage device. Therefore it can provide the notification of the past and present locations of the search target.

According to a fifth aspect of the present invention, a search system of the communications device in accordance with the present invention is a search system of a communications device having a plurality of gateways connected to the communications device, and a control server of the communications device, the control server comprising: memory control means for storing attribute information of the communications device sent from the gateways in a storage device with establishing correspondence with location information of the gateways; search request receiving means for receiving a search request including the attribute information; and search means for retrieving the location information of the gateways to which the communications device corresponding to the search request is connected by searching, in response to reception of the search request, for the attribute information stored in the storage device.

Thus, the control server stores attribute information of the communications device sent from the gateways in the storage device with establishing correspondence with location information of the gateways; receives the search request including the attribute information; and retrieves the location information of the gateways to which the communications device corresponding to the search request is connected by searching, in response to the reception of the search request, for the attribute information stored in the storage device. Therefore it can search for the communications device by designating the attribute even if a user does not know the identification information of the communications device.

According to a sixth aspect of the present invention, the control server of the communications device in accordance with the present invention comprises: memory control means for storing attribute information of the communications device sent from a plurality of gateways connected to the communications device in a storage device with establishing correspondence with location information of the gateways; search request receiving means for receiving a search request including the attribute information; and search means for retrieving the location information of the gateways to which the communications device corresponding to the search request is connected by searching, in response to reception of the search request, for the attribute information stored in the storage device.

Thus, it stores the attribute information of the communications device sent from the plurality of gateways connected to the communications device in the storage device with establishing correspondence with location information of the gateways; receives the search request including the attribute information; and retrieves the location information of the gateways to which the communications device corresponding to the search request is connected by searching, in response to the reception of the search request, for the attribute information stored in the storage device. Therefore it can search for the communications device by designating the attribute even if a user does not know the identification information of the communications device.

Here, the search request can include information about a designated time, and the search means can include notification request means for requesting the gateways to provide notification of the attribute information of the communications device connected to the gateways at the designated time received.

Thus, the search request includes the information about the designated time, and the gateways are requested to provide the notification of the attribute information of the communications device connected to the gateways at the designated time received. Therefore it can provide the notification of the location of the search target at any desired future point.

In addition, the search request of the communications device can include information about a geographical area, and the notification request means can request the gateways in the geographical area to provide notification of the attribute information of the communications device.

Thus, the search request of the communications device includes the information about the geographical area, and requests the gateways in the geographical area to provide the notification of the attribute information of the communications device. Therefore, it can narrow the search processing down to the specified geographical area, and reduce the load imposed on the network by the search processing.

Besides, it can further comprise estimating means for estimating the location of the communications device at a designated time from a plurality of location information items at different notification times stored in the storage device.

Thus, it estimates the location of the communications device at the designated time from the plurality of location information items at different notification times stored in the storage device. Therefore it can estimate locations in the past time not informed and predict future locations.

Furthermore, the communications device can be an IC tag attached to an article.

Thus using the IC tag attached to the article as the communications device enables the search of the article provided with the IC tag.

According to a seventh aspect of the present invention, the search method of the communications device in accordance with the present invention is a search method of the communications device in a control server of the communications device, the search method comprising: a step of storing attribute information of the communications device sent from a plurality of gateways connected to the communications device in a storage device with establishing correspondence with location information of the gateways; a step of receiving a search request including the attribute information; and a step of retrieving the location information of the gateways to which the communications device corresponding to the search request is connected by searching, in response to reception of the search request, for the attribute information stored in the storage device.

Thus, it stores attribute information of the communications device sent from the plurality of gateways connected to the communications device in the storage device with establishing correspondence with location information of the gateways; receives the search request including the attribute information; and retrieves the location information of the gateways to which the communications device corresponding to the search request is connected by searching, in response to the reception of the search request, for the attribute information stored in the storage device. Therefore it can search for the communications device by designating the attribute even if a user does not know the identification information of the communications device.

According to an eighth aspect of the present invention, a computer program in accordance with the present invention causes a computer to function as: memory control means for storing attribute information of the communications device sent from a plurality of gateways connected to the communications device in a storage device with establishing correspondence with location information of the gateways; search request receiving means for receiving a search request including the attribute information; and search means for retrieving the location information of the gateways to which the communications device corresponding to the search request is connected by searching, in response to reception of the search request, for the attribute information stored in the storage device.

Thus, it causes the computer to function as: the memory control means for storing attribute information of the communications device sent from the plurality of gateways connected to the communications device in the storage device with establishing correspondence with the location information of the gateways that send the identification information; search request receiving means for receiving the search request including the attribute information; and search means for retrieving the location information of the gateways to which the communications device corresponding to the search request is connected by searching, in response to the reception of the search request, for the attribute information stored in the storage device. Therefore it can search for the communications device by designating the attribute even if a user does not know the identification information of the communications device.

According to a ninth aspect of the present invention, a search system of the communications device in accordance with the present invention is a search system of a communications device having a plurality of first communications devices, a plurality of gateways connected to the first communications devices, and a control server for managing locations of the gateways, the first communications devices being able to communicate with a second communications device provided with identification information, the control server comprising: search request receiving means for receiving a search request including the identification information and information about a geographical area; and search request transmitting means for transmitting the identification information received to the gateways in the geographical area, and the gateways comprising: inquiring means for requesting the first communications devices to search for the second communications device that stores the identification information received; and inquiring result receiving means for receiving a result of the inquiry from the first communications devices.

Thus, the first communications devices are able to communicate with the second communications device provided with identification information, and the control server comprises: search request receiving means for receiving a search request including the identification information and information about a geographical area; and search request transmitting means for transmitting the identification information received to the gateways in the geographical area, and the gateways comprise: inquiring means for requesting the first communications devices to search for the second communications device that stores the identification information received; and inquiring result receiving means for receiving a result of the inquiry from the first communications devices.

Therefore it can increase the range of searchable targets because the first communications devices operate as additional gateways.

Here, the communications device can be an IC tag attached to an article.

Thus using the IC tag attached to the article as the communications device enables the search of the article provided with the IC tag.

According to a tenth aspect of the present invention, the search method of the communications device in accordance with the present invention is a search method of the communications device in a search system having a plurality of first communications devices, a plurality of gateways connected to the first communications devices, and a control server for managing locations of the gateways, the first communications devices being able to communicate with a second communications device provided with identification information, the method comprising: a step of receiving in the control server a search request including the identification information and information about a geographical area; a step of transmitting from the control server the identification information received to the gateways in the geographical area; a step of causing the gateways to request the first communications devices to search for the second communications device that stores the identification information received; and a step of receiving in the gateways a result of the search from the first communications devices.

Thus, it receives in the control server the search request including the identification information and information about a geographical area; transmits from the control server the identification information received to the gateways in the geographical area; causes the gateways to request the first communications devices to search for the second communications device that stores the identification information received; and receives in the gateways the result of the search from the first communications devices. Therefore it can increase the range of the searchable targets because the first communications devices operate as the additional gateways.

According to an eleventh aspect of the present invention, the information search system in accordance with the present invention is an information search system having a service agent server for receiving a transmission request of information from a terminal, and a control server for managing information to be provided to the terminal, the service agent server comprising: storing means for storing types of services to be provided to the terminal and attribute information of information collecting instruments with establishing correspondence between them; transmission request receiving means for receiving the transmission request including a type of service from the terminal; and transmitting means for extracting, from the storing means, attribute information corresponding to the type of service included in the transmission request, and for transmitting the attribute information to the control server, and the control server comprising: collected information storing means for storing the attribute information of the information collecting instruments and collected information transmitted from the information collecting instruments with establishing correspondence with locations of the information collecting instruments; and search means for retrieving the collected information corresponding to the received attribute information by searching the collected information storing means.

Thus, the service agent server stores the types of services to be provided to the terminal and the attribute information of the information collecting instruments with establishing correspondence between them; receives the transmission request including the type of service from the terminal; and extracts, from the storing means, the attribute information corresponding to the type of service included in the transmission request, and transmits the attribute information to the control server, and the control server stores the attribute information of the information collecting instruments and collected information transmitted from the information collecting instruments with establishing correspondence with locations of the information collecting instruments; and retrieves the collected information corresponding to the received attribute information. Therefore it can search for the information by designating the type of the service to be acquired even if a user does not know the entity ID.

Here, it can further comprise gateways for mediating communication between the information collecting instruments and the control server, and the collected information storing means can store locations of the gateways as the locations of the information collecting instruments.

Thus, it further comprises the gateways for mediating communication between the information collecting instruments and the control server, and stores the locations of the gateways as the locations of the information collecting instruments. Therefore it can identify the location of the communications device which is not registered in the network by the IDs of the gateways.

In addition, the search request receiving means can further receive information about a geographical area from the terminal; the transmitting means can further transmit the information about the geographical area; and the search means can acquire information collected by the information collecting instruments included in the geographical area received.

Thus, it further receives information about the geographical area from the terminal; further transmits the information about the geographical area; and acquires the information collected by the information collecting instruments included in the geographical area received. Therefore, it can narrow the search processing down to the specified geographical area, and reduce the load imposed on the network by the search processing.

Besides, the search request receiving means can further receive information about a designated time from the terminal; and the search means can acquire collected information at the designated time.

Thus, it further receives information about the designated time from the terminal; and collected information is acquired at the designated time. Therefore it can retrieve the information at any desired future point.

In addition, the control server can further comprise notification means for notifying the service agent server of the collected information acquired by the search means; and the service agent server can further comprise processing means for processing the collected information sent from the notification means into offering information to be provided to the terminal.

Thus the control server notifies the service agent server of the collected information acquired by the search means; and the service agent server processes the collected information into offering information to be provided to the terminal. Therefore it can edit the collected information in accordance with the interface of the terminal.

Here, the storing means can store the collected information and the offering information with establishing correspondence between them; and the processing means can retrieve from the storing means the offering information corresponding to the collected information sent by the notification means.

Thus, it stores the collected information and the offering information with establishing correspondence between them;

and retrieves from the storing means the offering information corresponding to the collected information. Therefore when it collects numerical information, it can provide the texts and images corresponding thereto to the terminal.

Here, the control server can further comprise notification means for sending a notification to the service agent server when the collected information retrieved by the search means meets a prescribed condition.

Thus, the control server sends the notification to the service agent server when the collected information retrieved meets a prescribed condition. Therefore when the communications device enters into a predetermined condition, it can notify the user.

In addition, the information search system can further comprise setting means for setting operating conditions of the information collecting instruments corresponding to the search request.

Thus, it sets the operating conditions of the information collecting instruments corresponding to the search request. Therefore it can execute upgrade or the like of the software installed in the communications device.

Besides, the search means can retrieve a plurality of collected information items transmitted from one of the information collecting instruments in the past; and further comprise estimating means for estimating, from the plurality of collected information items, the collected information to be transmitted from one of the information collecting instruments at a designated time.

Thus, it retrieves the plurality of collected information items transmitted from one of the information collecting instruments in the past; and estimates, from the plurality of collected information items, the collected information to be transmitted from one of the information collecting instruments at the designated time. Therefore, even if the user does not know the entity ID, the user can estimate the information by designating the type of the service he or she wants to receive.

According to a twelfth aspect of the present invention, an information search method in accordance with the present invention is an information search method in an information search system having a service agent server for receiving a transmission request of information from a terminal, and a control server for managing information to be provided to the terminal, the service agent server having storing means for storing types of services to be provided to the terminal and attribute information of information collecting instruments with establishing correspondence between them, the control server having collected information storing means for storing identification information of the information collecting instruments and the collected information transmitted from the information collecting instruments with establishing correspondence with locations of the information collecting instruments, the information search method comprising: a step of receiving, in the service agent server, the transmission request including a type of service from the terminal; a step of extracting, in the service agent server, the attribute information corresponding to the type of service included in the transmission request from the storing means, and of transmitting the attribute information to the control server; and a step of retrieving, in the control server, collected information of the information collecting instruments corresponding to the received attribute information by searching the collected information storing means.

Thus, it receives, in the service agent server, the transmission request including a type of service from the terminal; extracts, in the service agent server, the attribute information corresponding to the type of service included in the transmission request from the storing means, and transmits the attribute information to the control server; and retrieves, in the control server, collected information of the information collecting instruments corresponding to the received attribute information. Therefore, even if the user does not know the entity ID, the user can conduct a search for the information by designating the type of the service he or she wants to receive.

According to the present invention, it is possible to carry out the search for the articles and the like with designating the time. Accordingly, the load imposed on the network can be reduced in the search processing. Besides, it is possible to track the search target article along the passage of time.

In addition, an increase in the range of observable targets enables the search of a greater number of targets. Besides, when requesting users of mobile phones to search for the article to which the IC tag is attached, giving a reward to the user who finds the search target will increase the incentive to search.

Furthermore, even if the user cannot specify the identification information of the search target, the user can conduct the search with designating the type and attribute of the search target.

Besides, it is possible for the network to select optimum information items or to combine selected information items at providing services.

Moreover, it is possible to search for the record of past locations of a communications device, or to process information such as mapping a route of the communications device on a map for providing to the user.

BRIEF DESCRIPTION OF THE DRAWINGS

FIG. 8 illustrates information stored in the service agent server of one embodiment in accordance with the present invention;

FIG. 16 illustrates information to be stored in the service agent server of one embodiment in accordance with the present invention;

FIG. 19 illustrates exemplary information stored in the entity management server of one embodiment in accordance with the present invention; and FIG. 20 shows relationships between addresses and communications protocols on a network side and communications protocols and IDs on a real world side according to classification of entities.

BEST MODE FOR CARRYING OUT THE INVENTION

Preferred embodiments of the present invention will be described below with reference to the drawings.

Figure 1:
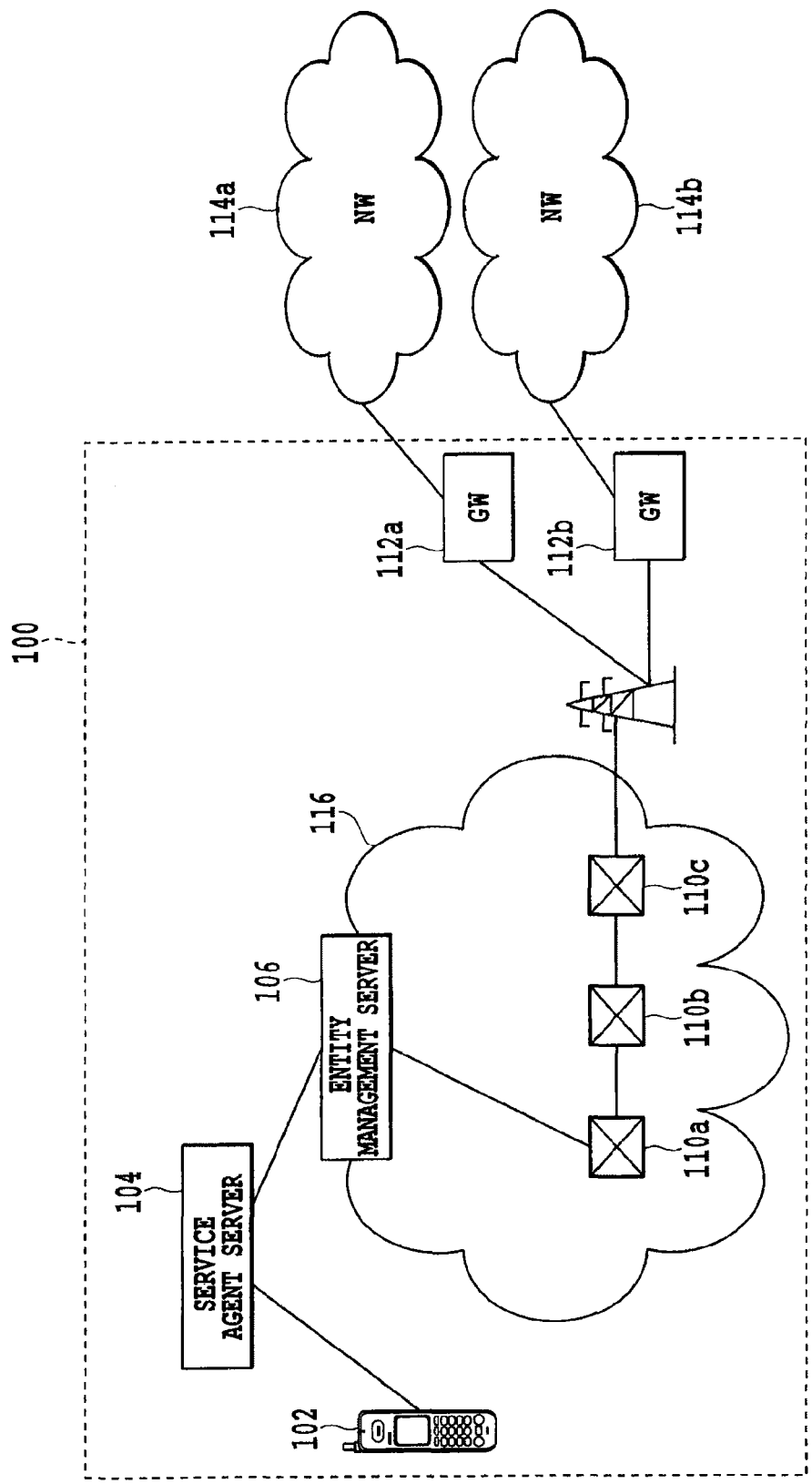
FIG. 1 is a block diagram showing a general configuration of a search system in accordance with the present invention.

FIG. 1 is a block diagram showing a general configuration of a search system in accordance with the present invention. The search system comprises a wide-area network 100 managed by a carrier, and local area networks 114a and 114b (sometimes shortened to "network 114" from now on) that are connected to the wide-area network 100. The wide-area network 100 includes a mobile terminal 102, service agent server 104, entity management server 106, mobile network 116, gateways (GWs) 112a and 112b (sometimes shortened to "gateway 112" from now on).

The mobile terminal 102 is implemented by installing software that achieves the access function to the Internet and browsing of the Web information in a mobile terminal such as a mobile phone, PHS and PDA of a subscriber or customer of a mobile communication network 116. Alternatively, the mobile terminal 102 can be a terminal with an E-mail function.

The service agent server 104 is a computer acting as an agent of the service corresponding to the service ID received from the mobile terminal 102. The actual service is offered by the entity management server 106, gateway 112 or the like. The service agent server 104 also carries out edition and analysis of the information received from the entity management server 106 or gateway 112.

The mobile network 116 includes an entity management server 106 and nodes 110a, 110b and 110c connected to the entity management server 106.

The nodes 110a, 110b and 110c are each identified by a routing address.

The entity management server 106 is a computer that stores the location information about the mobile terminal and gateway registered in the mobile network 116. The entity management server 106, which can manage the identification information of the gateways 112a and 112b and of the communications device connected to the gateways, is communicably connected to the service agent server 104. The identification information of the communications device is called "entity ID" from now on.

The gateway 112a carries out communication with the communications device connected to the network 114a. In addition, the gateway 112b carries out communication with the communications device connected to the network 114b.

Figure 2:
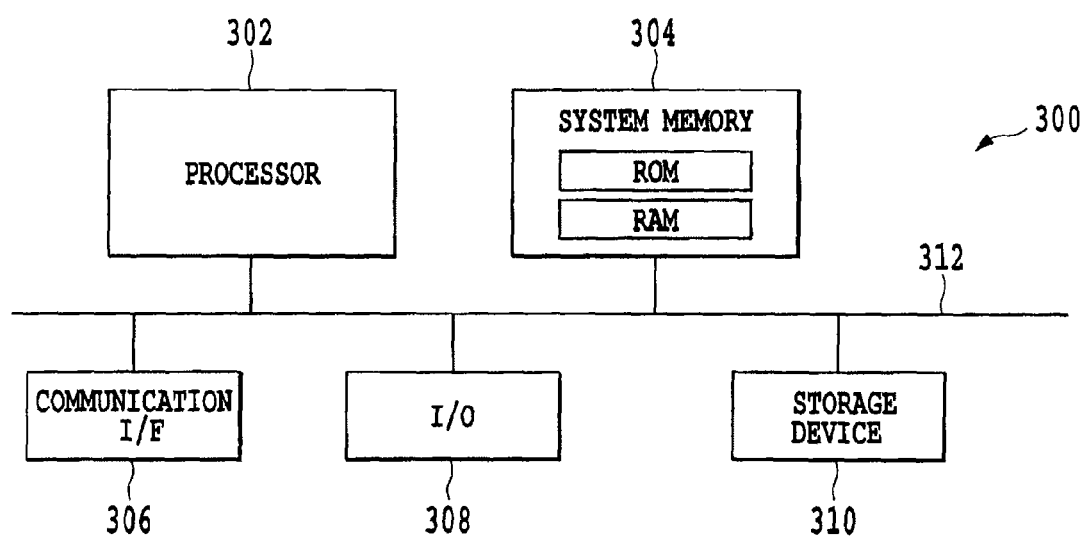
FIG. 2 is a block diagram showing a hardware configuration of a computer system used for a service agent server and entity management server in accordance with the present invention.

FIG. 2 shows a hardware configuration of a computer system used for the service agent server and entity management server in accordance with the present invention. The computer system 300 comprises at least one processor 302, system memory 304, communication interface (I/F) 306, input/output interface (I/O) 308, and storage device 310, which are connected to a system bus 312.

The processor 302 has a microprocessor configuration including a CPU, timer and CPU peripheral circuit.

The system memory 304 can be a volatile memory such as a RAM, a nonvolatile memory such as a ROM and flash memory, or a combination of these two memories. The system memory 304 can usually include an operating system, application programs and program data. As the storage device 310 which is a nonvolatile storage medium that stores the operating system, application programs and program data, it is possible to use an optical storage medium such as a CD-ROM and DVD or a magnetic storage medium such as a magnetic disk, or other mediums usable for storing desired information and accessible by the computer system 300. The system memory 304 and storage device 310 constitute the computer storage medium of the computer system 300.

The I/O 308 carries out communication with input devices such as a keyboard, mouse, pen, voice input device and touch input device, and output devices such as a display, speaker and printer.

In addition, the computer system 300 includes a communication interface 306 for enabling the computer system to carry out communication with other computer systems via a network or the like. The communication medium for carrying out the communication includes a wire medium such as a wire network or direct wire connection, or a wireless medium such as an acoustic medium, RF medium and infrared medium.

The functions of the service agent server 104 and entity management server 106 are implemented by the processor 302 that reads the programs stored in the computer storage medium and executes them. The service agent server 104 and entity management server 106 can be installed in a single computer system as shown in FIG. 2, or in a distributed computing environment consisting of a plurality of computer systems.

Figure 3:
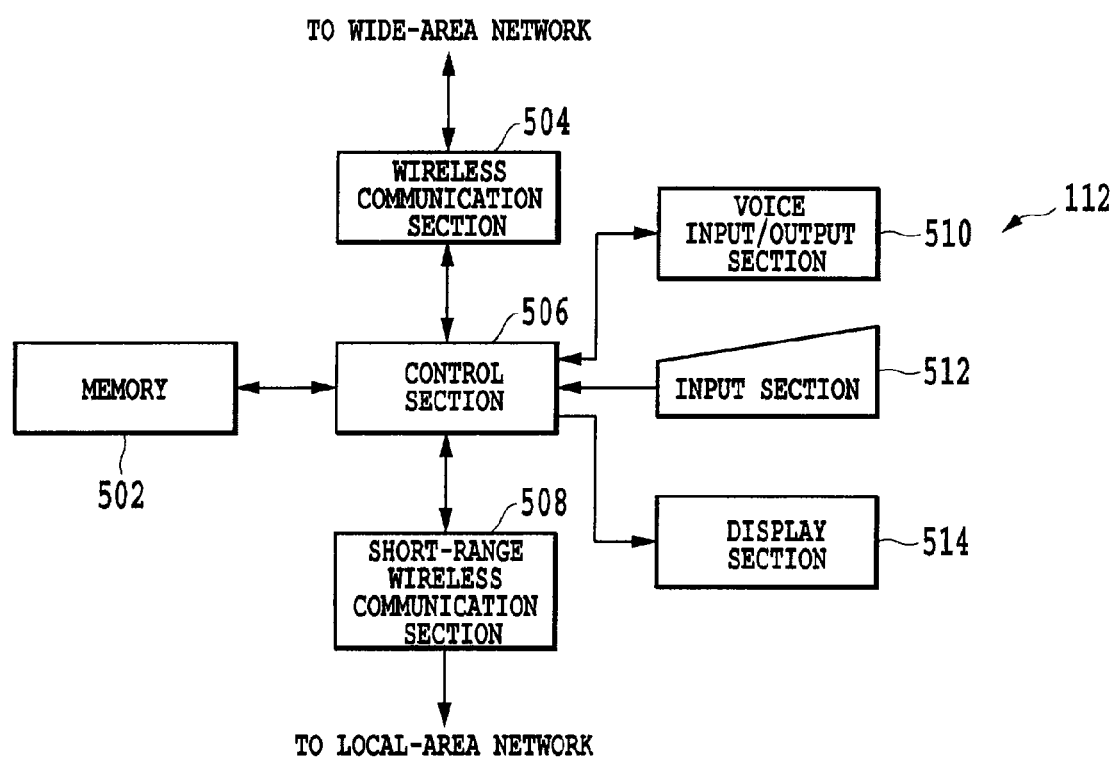
FIG. 3 is a block diagram showing an exemplifying hardware configuration of a gateway in accordance with the present invention.

FIG. 3 shows an exemplifying hardware configuration of the gateway 112. FIG. 3 shows a configuration example using a mobile phone with short-range wireless communication functions as the gateway 112. The gateway 112 includes a memory 502, wireless communication section 504, control section 506, short-range wireless communication section 508, voice input/output section 510, input section 512 and display section 514.

The control section 506 has a microprocessor configuration including a CPU, timer and CPU peripheral circuit. The CPU establishes connections with the foregoing components via a bus, and carries out overall control of the gateway 112 by executing the programs stored in a program storing memory not shown. In addition, the CPU executes and controls the individual functions of the gateway 112 in response to the signal input from the input section 512.

The memory 502 is composed of a temporary memory such as a DRAM and high-speed RAM, and can read application programs and communication programs timely from an external medium. The functions of the gateway 112, which will be described later, are achieved by the execution of these programs.

The input section 512, which is an input means for a user to input instructions for executing the search processing of the communications device and other instructions necessary, includes input keys or buttons, and keys for moving a cursor and for providing instructions.

The wireless communication section 504 carries out transmission and reception of the wireless signals with the mobile network through an antenna. On the other hand, the short-range wireless communication section 508 is configured in such a manner that it can carry out transmission and reception of the wireless signals with the communications device in the local area network 114.

The display section 514 displays an image stored in a display memory not shown. The voice input/output section 510 converts the received wireless signal to a voice signal to be output, or converts the voice input by a user to an electric signal.

Incidentally, the gateway may be a device fixedly connected to a wire/wireless channel rather than a mobile device. For example, the gateway can be placed in fixed point observation equipment of nature/environment, road and railway, or at a door, fare adjustment/entrance gate of a building or transportation transfer point.

(Embodiment 1)

Next, an embodiment will be described which searches for a communications device by designating time.

Figure 4:
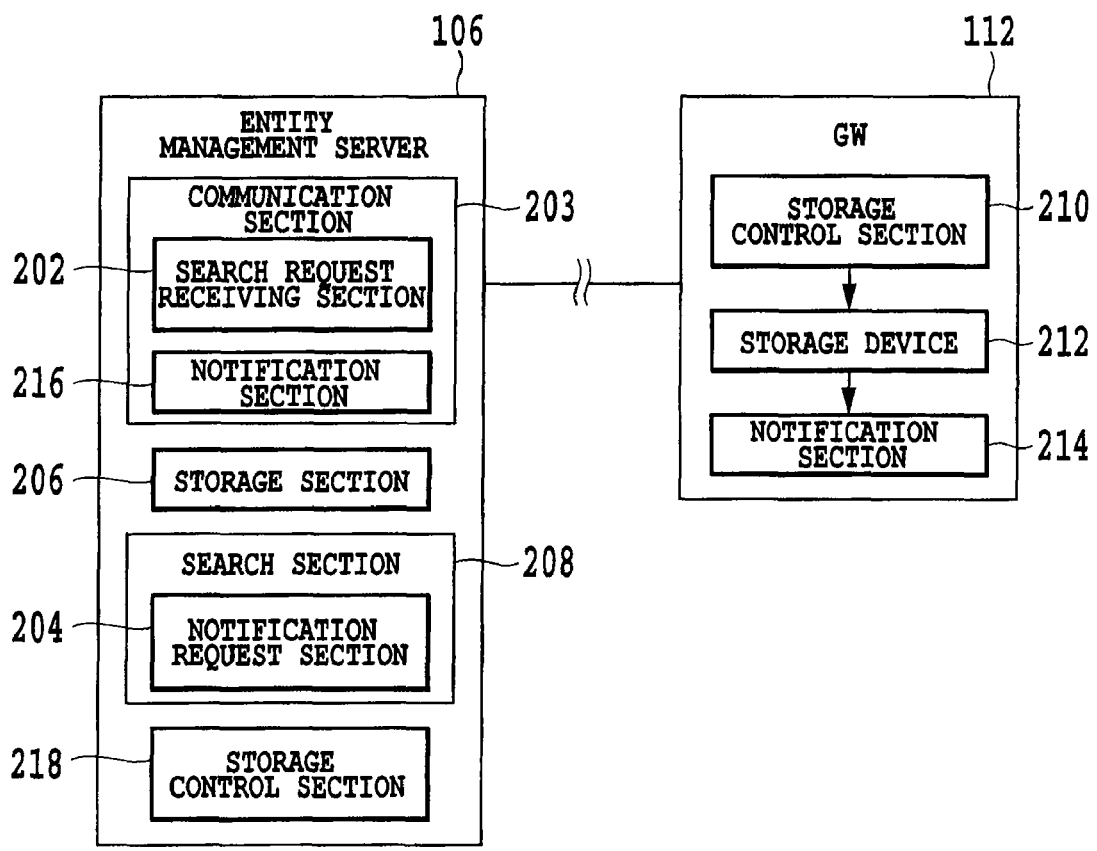
FIG. 4 is a block diagram showing a functional configuration of the entity management server and gateway of one embodiment in accordance with the present invention.

FIG. 4 shows a functional configuration of an entity management server and gateway of the present embodiment.

The entity management server 106 includes a communication section 203, storage section 206, search section 208 and storage control section 218.

The communication section 203 is provided for carrying out communication with the service agent server 104 and gateway 112. The communication section 203 includes a search request receiving section 202 for receiving a search request from the service agent server 104, and a notification section 216 for notifying of the location of the gateway to which the search target communications device is connected.

The search section 208 searches for the entity ID at the designated time stored in the storage section 206 in response to the reception of the search request, and acquires the location information about the gateway to which the communications device corresponding to the search request is connected. In addition, the search section 208 includes a notification request section 204. The notification request section 204 requests the gateway 112 to provide notification of the entity ID at the designated time when the search request includes the present or future time as the designated time. Receiving the entity ID from the gateway 112, the search section 208 matches the entity ID with the entity ID in the search request.

The storage control section 218 associates the entity ID of the communications device sent from the gateway 112 with the location information about the gateway 112 that sends the entity ID, and stores them in the storage section 206 at every notification time.

The gateway 112 includes a storage control section 210, storage device 212 and notification section 214.

The storage control section 210 stores the entity ID transmitted from the communications device into the storage device 212.

The storage device 212 stores the entity ID of the communications device connected to the gateway 112.

The communications device can include electronic appliances such as a printer connected to a local area network, or an IC tag attached to an article and capable of communicating with the gateway.

The notification section 214 notifies the entity management server 106 of the entity ID stored in the storage device 212 when it receives the notification request of the entity ID from the entity management server 106.

Figure 5:
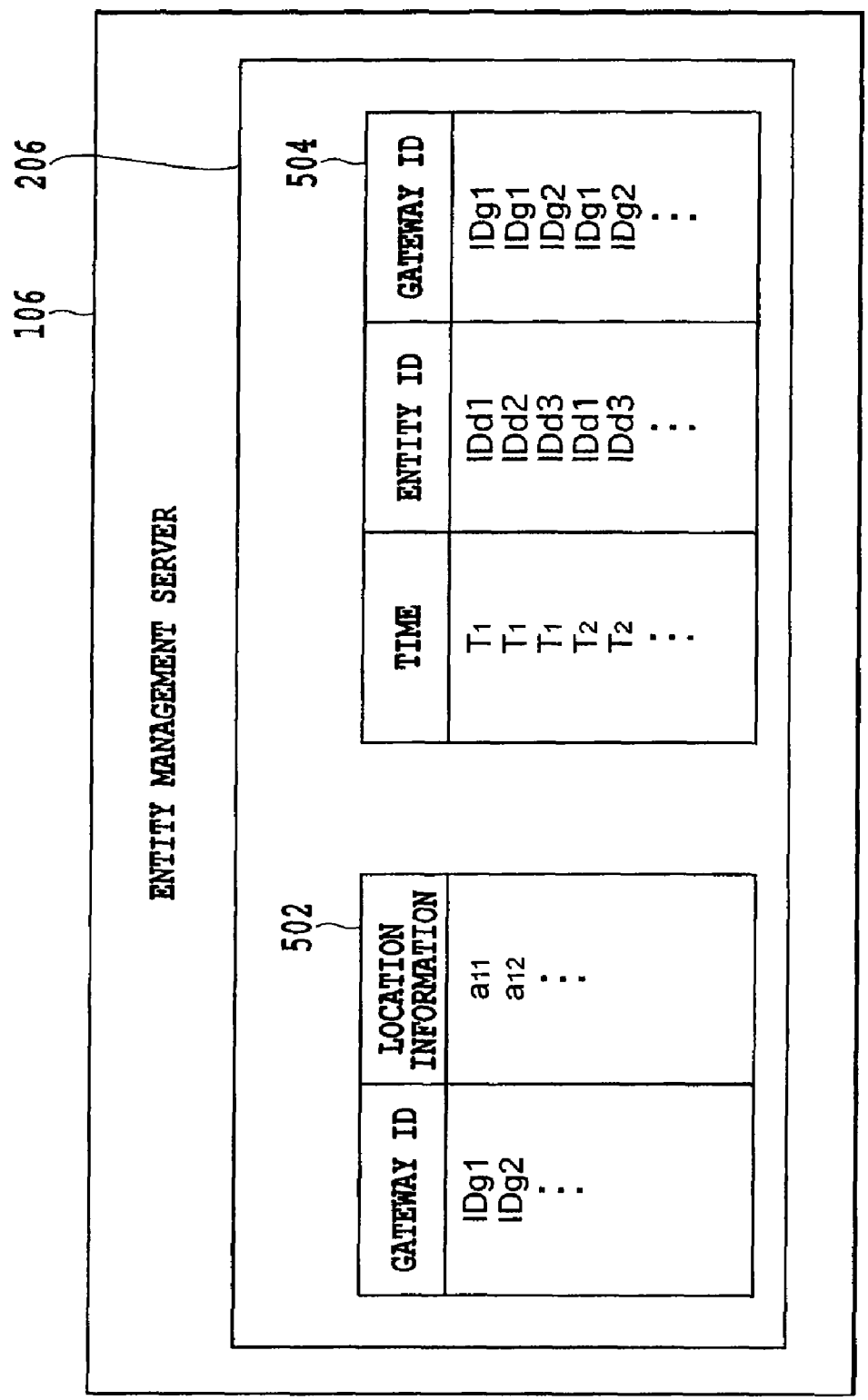
FIG. 5 illustrates information stored in the entity management server of one embodiment in accordance with the present invention.

FIG. 5 shows an example of the information stored in the entity management server 106. The storage section 206 of the entity management server 106 includes a table 502 and table 504. The table 502 stores a plurality of identification information items (IDg1, IDg2, . . . ) and location information items (a11, a12, . . . ) of the gateways with establishing correspondence between them. The location information items can be grouped in terms of specified geographical areas. In the following description, the identification information item of the gateway is referred to as a gateway ID.

The table 504 stores the notification time (T1, T2, . . . ), that is, the time at which the gateway 112 sends the entity IDs, the entity IDs of the communications device sent at the time, and the gateway IDs used for identifying the gateways that send the entity IDs, with establishing correspondence between them.

Figure 6:
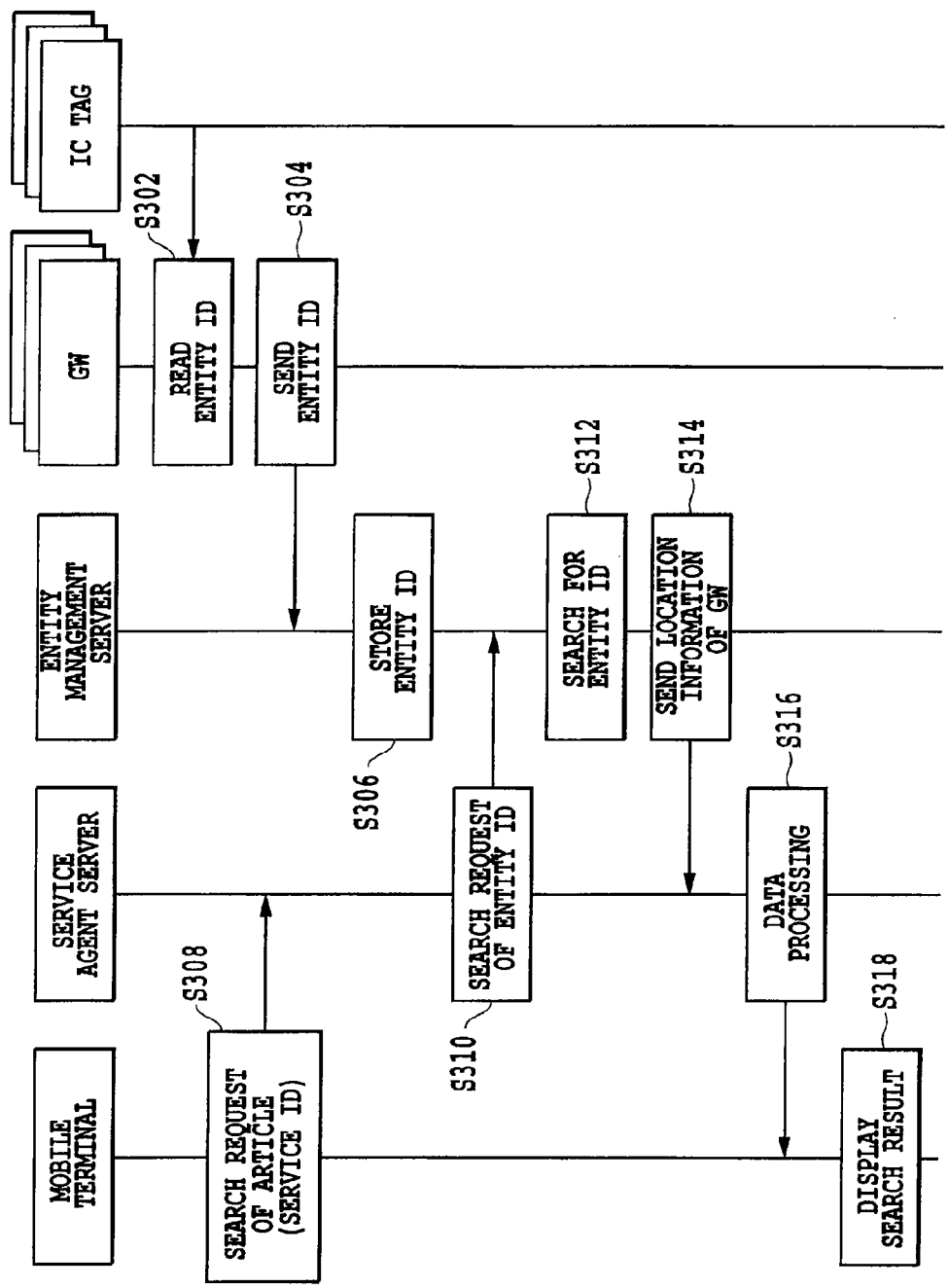
FIG. 6 is a communication sequence chart showing a procedure of a search method of the communications device of one embodiment in accordance with the present invention.

Next, a procedure of the search method of the communications device of the present embodiment will be described with reference to the communication sequence chart of FIG. 6. The present embodiment will be described by way of example of a processing in which a mobile terminal user requests the search system to search for an article. Here, an IC tag is attached to each article, and each IC tag is identified by the entity ID. The gateway 112 group has a function of reading the entity ID stored in the IC tag.

The gateway 112 group reads the entity IDs from the IC tags (step S302) at regular intervals, and notifies the entity management server 106 of them along with the gateway IDs (step S304). The entity management server 106 stores the notified entity IDs in the storage section 206 with establishing correspondence between them and the notification time and gateway IDs (step S306).

Here, the notification of the entity IDs from the gateway 112 group can be carried out irregularly such as at a time when the connection is established with new communications device.

The actual search processing starts from step S308. At step S308, the mobile terminal 102 transmits the search request of the communications device to the service agent server 104. The search request includes the service ID, entity ID of the IC tag to be searched for, and information about the past designated time. The service ID is the information for identifying the service the mobile terminal 102 requests to be offered.

At step S310, the service agent server 104 makes a decision from the service ID that the information transmitted from the mobile terminal 102 is a search request of an article. Subsequently, the service agent server 104 transmits the information about the entity ID, geographical area and designated time contained in the search request to the entity management server 106. Thus, the entity management server 106 receives the entity ID and designated time transmitted from the terminal via the service agent server 104.

At step S312, the entity management server 106 searches for the entity ID stored in the table 504 of the storage section 206 at the designated time. When it finds the entity ID contained in the search request, it acquires the gateway ID associated with the entity ID. In addition, referring to the table 502, the entity management server 106 acquires the location information corresponding to the gateway ID. In this way, the entity management server 106 acquires the location information about the gateway to which the communications device corresponding to the search request is connected.

Subsequently, the entity management server 106 extracts the location information about the gateway to which the located IC tag is connected, and notifies the service agent server 104 of it (step S314).

Here, the gateway ID can be notified instead of the location information about the gateway.

At step S316, the service agent server 104 processes the received information about the gateway 112, and produces screen data that can be displayed on the mobile terminal. The screen data produced are sent to the mobile terminal 102.

At step S318, the mobile terminal 102 displays an image on the display section in response to the received screen data.

Incidentally, the search request may include the present time or future time as the designated time. In addition, the search can be carried out according to the present time when the search request is made without designating the time.

Figure 7:
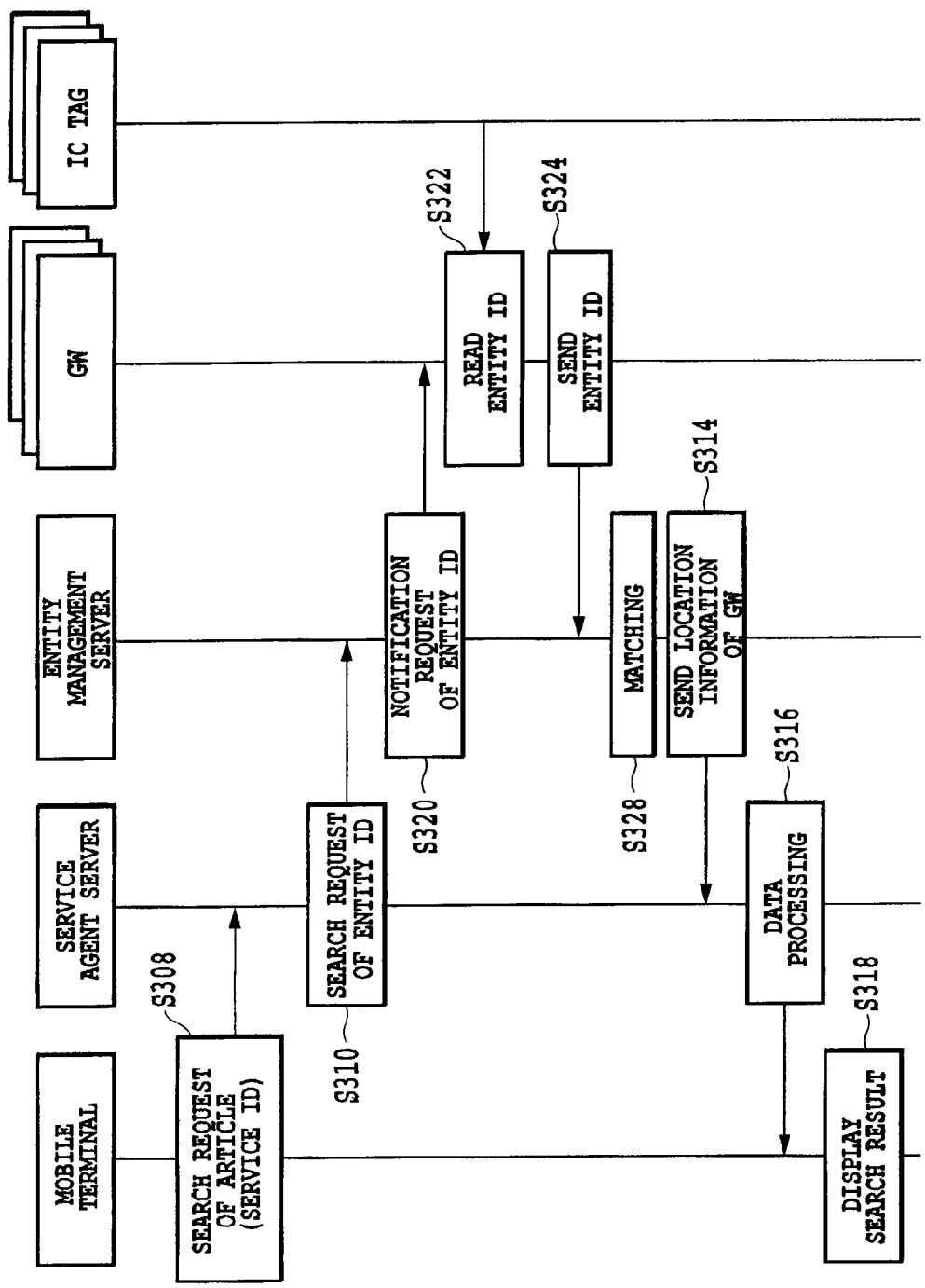
FIG. 7 is a communication sequence chart showing a procedure of a search method of the communications device of one embodiment in accordance with the present invention.

In this case, as shown in FIG. 7, the notification request section 204 of the entity management server 106 requests the gateway 112 group to send the notification of the entity ID at the designated time at step S320. The gateway reads the entity ID from the IC tag (step S322), and notifies the entity management server 106 of it (step S324). The entity management server 106 matches the entity ID sent from the gateway 112 group with the entity ID contained in the search request (step S328). Subsequently, the entity management server 106 acquires the location information about the gateway 112 to which the located IC tag is connected, and notifies the service agent server 104 of it (step S314).

Here, the search request can include the information about the geographical area in which the search is to be carried out. In this case, the notification request section 204 identifies from the table 502 of FIG. 5 the gateway 112 group whose notification is to be requested, in terms of the geographical area, and requests the notification of the entity ID from the identified gateway 112 group. Thus limiting the geographical area in which the search is to be carried out makes it possible to reduce the information amount to be communicated, and to reduce the load of the network.

In addition, the entity management server 106 can carry out the matching at step S328 for the regular notification from the gateway 112 group without making the notification request at step S320.

Furthermore, the matching at step S328 by the entity management server 106 can be carried out by the gateway 112 group. In this case, at step S320, the entity management server 106 transmits the entity ID associated with the search to the gateway 112 group to request the notification of the entity ID. The gateway 112 group holding the corresponding entity ID makes a reply to the notification request.

Moreover, although the service agent server 104 processes the data in the foregoing example, the entity management server 106 can carry out the processing. In this case, the entity management server 106 can transmit the processed data to the mobile terminal 102 directly.

(Embodiment 2)

It is also possible to estimate the location at a specific time or at a later time by extracting a traveling speed or traveling inclination from the past traveling record of the communications device.

In a simple example of estimating the location of the communications device, the speed of the communications device, which is obtained from the location information about a plurality of gateways 112 within a certain time range, is obtained as a function v(t) of the time t. In this case, the x-coordinate $x(t_f)$ of the location of the communications device at time $t_f$ can be obtained from the following expression using the position $x_0$ of the communications device at time $t_0$ in the x-coordinate direction.

$$x(t_f) = x_0 + \int_{t_0}^{t_f} v(t) dt$$

In addition, it is also possible to analyze the traveling whether it is a walk or car or rail travel by superposing roads and railways on a map, or to estimate, when it is identified that the traveling is done using a public transportation system, the traveling with reference to a timetable thereof. Furthermore, when the gateway is installed in fixed-point observation equipment or a ticket gate of a road or railway, or in a transportation relay point, the traveling means can be identified easily without superposing the map information.

It is also possible to estimate the location of the same communications device by learning from extracting past rules from tracks of the target communications device a year ago, or from its tracks on the same day of the week.

(Embodiment 3)

Next, an embodiment will be described which can carry out the search with designating an attribute of the search target even when the user cannot identify the entity ID of the search target.

As for the entity management server 106 and gateway 112 group of the present embodiment, those as shown in FIG. 4 and having the functions described in the embodiment 1 can be used. In addition, the entity management server 106 stores the information as shown in FIG. 5.

FIG. 8 shows an example of the information stored in the service agent server 104 of the present embodiment. The service agent server 104 stores the service ID and attribute information of the communications device.

The attribute information can be information indicating the name of the communications device itself.

In addition, when the communications device is an object attached to an article (teddy bear) such as an IC tag, the attribute information about the communications device can be information indicating the attribute of that article.

Furthermore, the service agent server 104 can store a more detailed attribute such as distinguishing the attribute in accordance with the performance and quality of the communications device.

Moreover, instead of providing attributes such as a thermometer, hygrometer and rainfall meter, a single attribute can be provided for these articles such as a measuring instrument.

In addition, one entity ID can be provided with a plurality of attribute information items.

Figure 9:
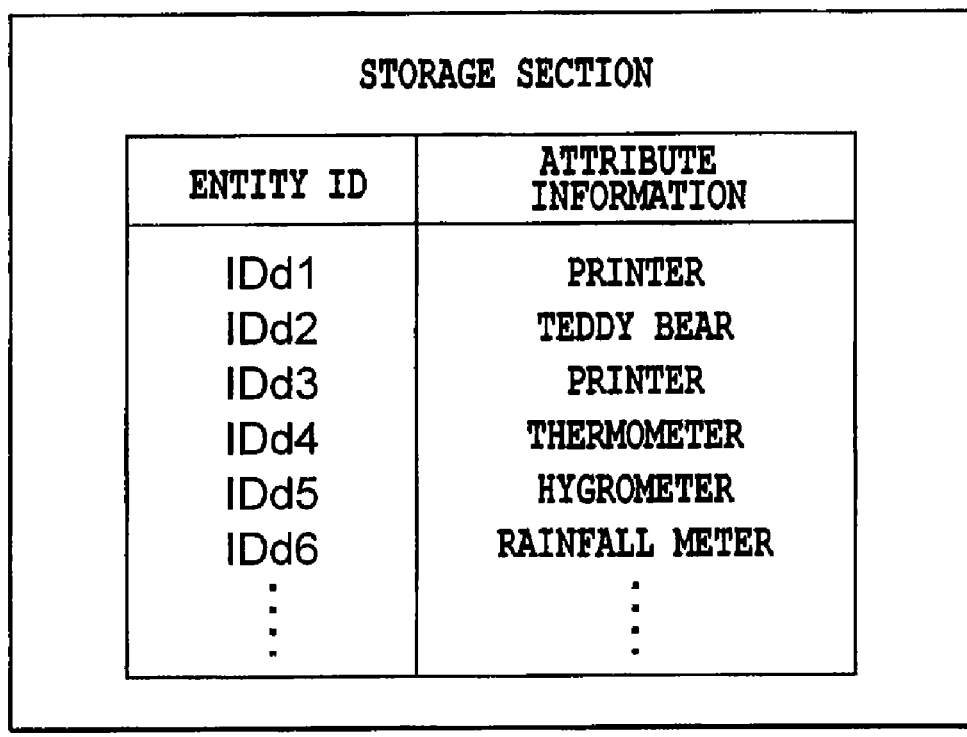
FIG. 9 illustrates an example of information stored in the entity management server of one embodiment in accordance with the present invention.

FIG. 9 shows an example of the information stored in the entity management server 106 of the present embodiment. The storage section 206 of the entity management server 106 can store, besides the information shown in FIG. 5, the entity ID and the attribute information of the communications device with establishing correspondence between them.

Figure 10:
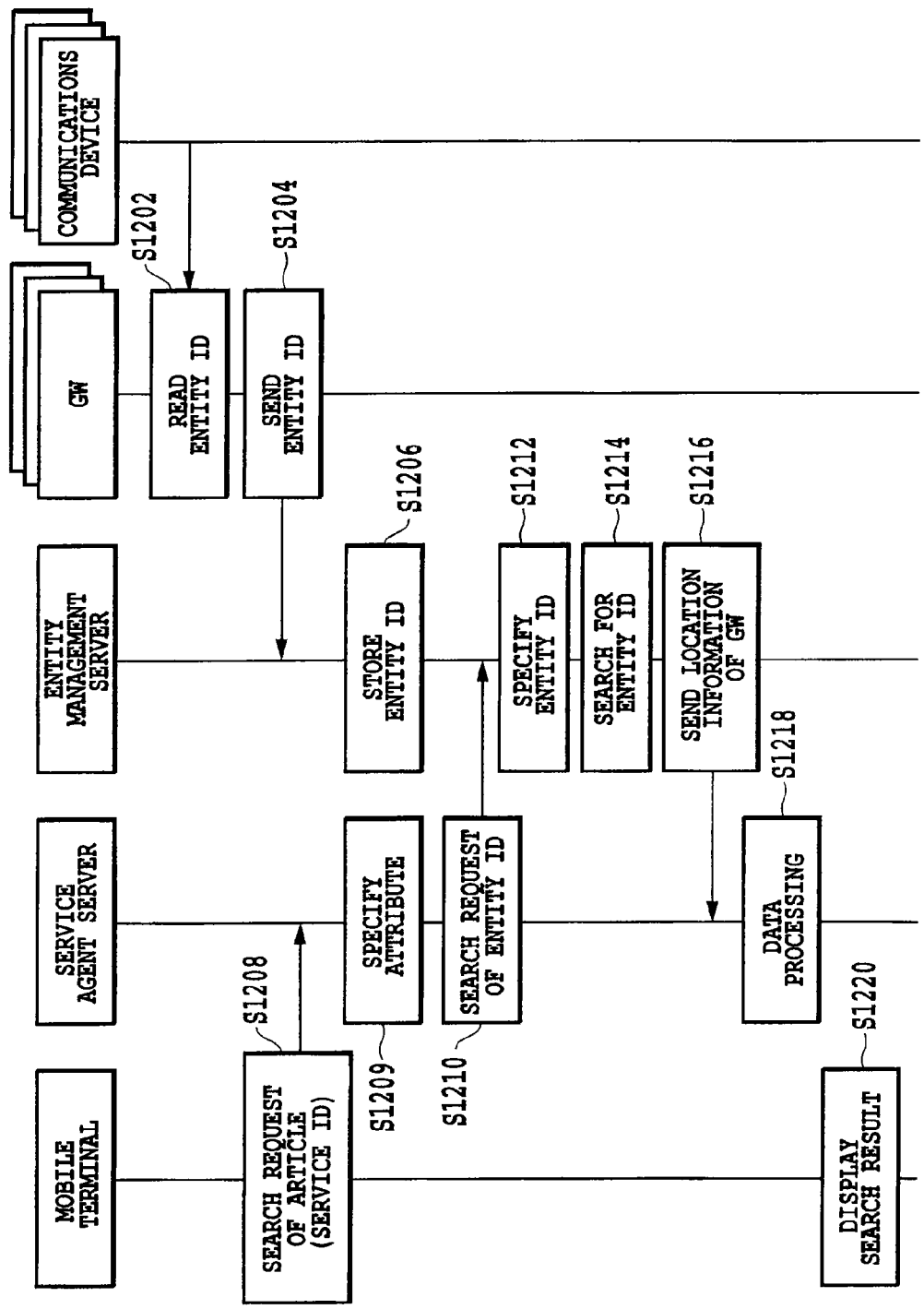
FIG. 10 is a communication sequence chart showing a procedure of a search method of the communications device of one embodiment in accordance with the present invention.

Next, referring to the communication sequence chart of FIG. 10, a procedure of the search method of the present embodiment will be described. The present embodiment will be described by way of example of processing in which the user of the mobile terminal requests the search system to search for output equipment nearby to output a file such as printing with a printer.

The gateway 112 group reads the entity IDs from the communications device at regular intervals (step S1202), and notifies the entity management server 106 of them along with the gateway IDs (step S1204). The entity management server 106 stores the notified entity IDs in the storage section 206 with establishing correspondence between them and the notification time and gateway IDs (step S1206).

Here, the notification of the entity IDs from the gateway 112 group can be carried out irregularly such as at a time when a communication device is newly connected.

The actual search processing starts from step S1208. At step S1208, the mobile terminal 102 transmits an output request of a file to the service agent server 104. The output request includes the service ID, and information about the past designated time at which the search is to be made. The service ID is the information for identifying the service the mobile terminal 102 requests to be offered. In the present embodiment, the service ID indicating the "search request of output equipment" can be associated with entity IDs of a printing machine such as a printer, an image output device such as a display, and a voice output device such as a speaker.

At step S1209, the service agent server 104 makes a decision from the service ID that the information transmitted from the mobile terminal 102 is a search request of the output equipment. Then, referring to the information as shown in FIG. 8, the service agent server 104 identifies the attribute of the communications device corresponding to the service ID.

At step S1210, the service agent server 104 transmits the identified attribute and information about the designated time to the entity management server 106.

At step S1212, referring to the information as shown in FIG. 9, the entity management server 106, which received the attribute and designated time, identifies the entity ID associated with the attribute.

At step S1214, the entity management server 106 searches for the entity ID stored in the table 504 of the storage section 206 at the designated time. When the entity ID contained in the search request is found, the entity management server 106 acquires the gateway ID associated with the entity ID. In addition, referring to the table 502, the entity management server 106 acquires the location information corresponding to the gateway ID.

In this way, the location information is obtained about the gateway 112 to which the communications device corresponding to the search request is connected. The location information about the gateway 112 is sent to the service agent server 104 (step S1216).

Here, it is also possible to make the notification of the gateway ID instead of the location information about the gateway 112.

At step S1218, the service agent server 104 processes the received location information about the gateway 112 to produce the screen data that can be displayed on the mobile terminal. The screen data produced is sent to the mobile terminal 102.

At step S1220, according to the received screen data, the mobile terminal 102 displays the image on the display section.

Incidentally, the search request can include the present time or future time as in the designated time. In addition, the search can be carried out according to the present time when the search request is made without designating the time.

Figure 11:
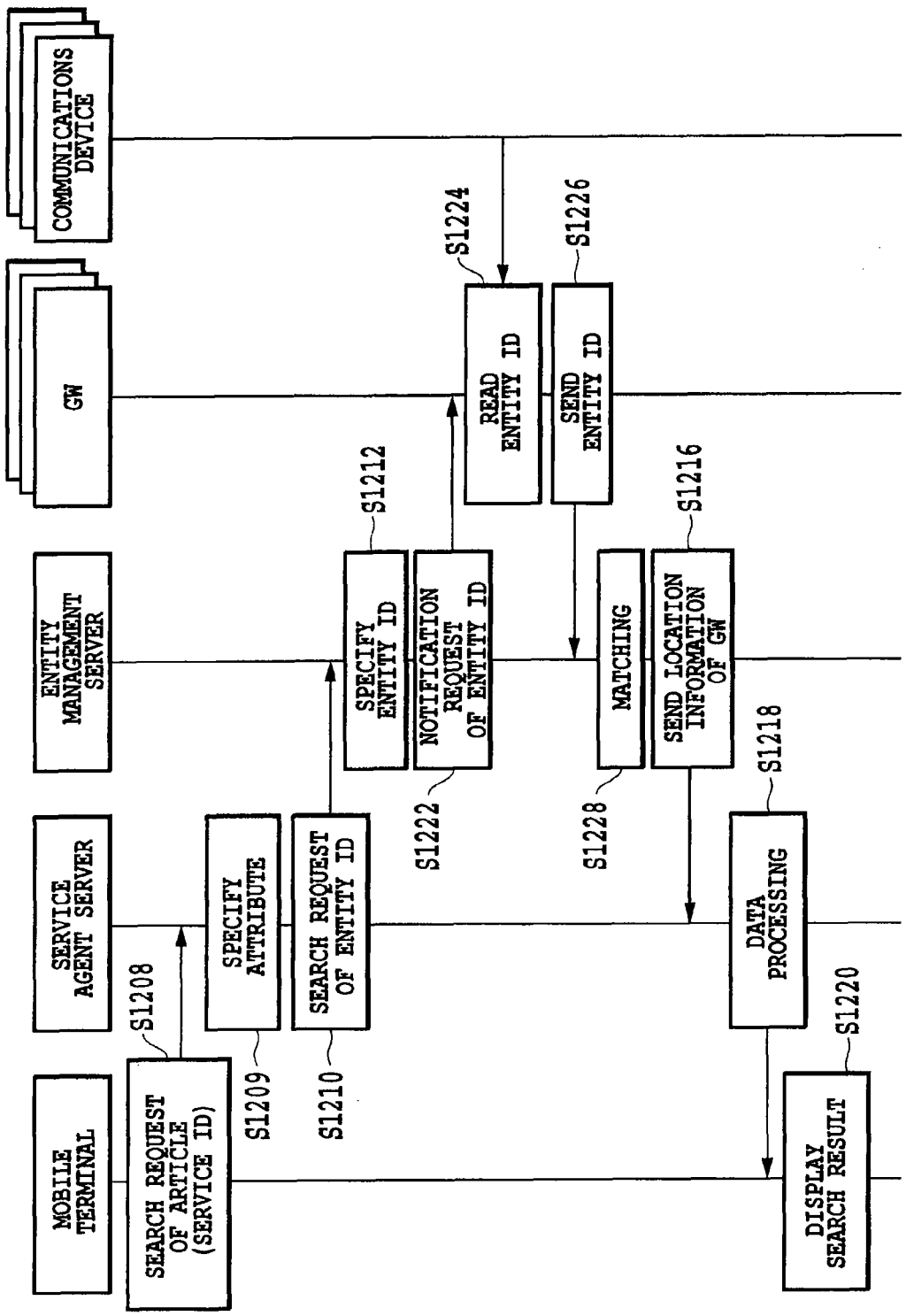
FIG. 11 is a communication sequence chart showing a procedure of a search method of the communications device of one embodiment in accordance with the present invention.

In this case, as shown in FIG. 11, at step S1222, the notification request section 204 of the entity management server 106 requests the gateway 112 group to send the entity ID at the designated time. The gateway reads the entity ID from the IC tag (step S1224), and notifies the entity management server 106 of the entity ID (step S1226). The entity management server 106 matches the entity ID sent from the gateway 112 group with the entity ID contained in the search request (S1228). Subsequently, the entity management server 106 acquires the location information about the gateway 112 to which the IC tag found is connected, and sends it to the service agent server 104 (step S1218).

Here, the search request can include information about the geographical area in which the search is to be made. In this case, the notification request section 204 identifies the gateway 112 group whose notification is to be sent, using the table 502 of FIG. 5 according to the geographical area, and requests the identified gateway 112 group to send the entity ID. Thus limiting the geographical area in which the search is to be made enables reduction in the information amount of the communication and in the load of the network.

In addition, it is possible to perform matching at step S1228 for the regular notification from the gateway 112 group without making the notification request at step S1222.

Furthermore, the gateway 112 group can perform the matching the entity management server 106 carries out at step S1228. In this case, the entity management server 106 transmits the entity ID associated with the search to the gateway 112 group at step S1222, and requests the notification of the entity ID. The gateway 112 holding the corresponding entity ID makes a reply to the notification request.

It is also possible to register attributes of events or moving objects, which suit user's taste, as the attribute information of the present embodiment, and to provide a service of searching them. For example, as the attributes of the communications device, it can employ taxis, buses, traveling sales vehicles such as those of stalls/flowers, maintenance services, traveling services, stages for traveling events and the like. In addition, the attributes can be patrolling attendants, traveling sales persons, security guards and the like in theme parks, event halls and sports stadiums.

In addition, when there are a plurality of candidates of objects having attributes of the candidates, such a configuration is also possible which notifies the mobile terminal 102 of the plurality of candidates, causes the mobile terminal 102 to display the search results notified, and enables the user to select the optimum object from the candidates. Such a configuration is effective when the mobile terminal 102 transmits desired data to the communications device (such as selecting the nearest printer from the plurality of printers searched, and requesting printing by transmitting image data).

(Embodiment 4)

Next, an embodiment will be described which can increase an observable target area.

Figure 12:
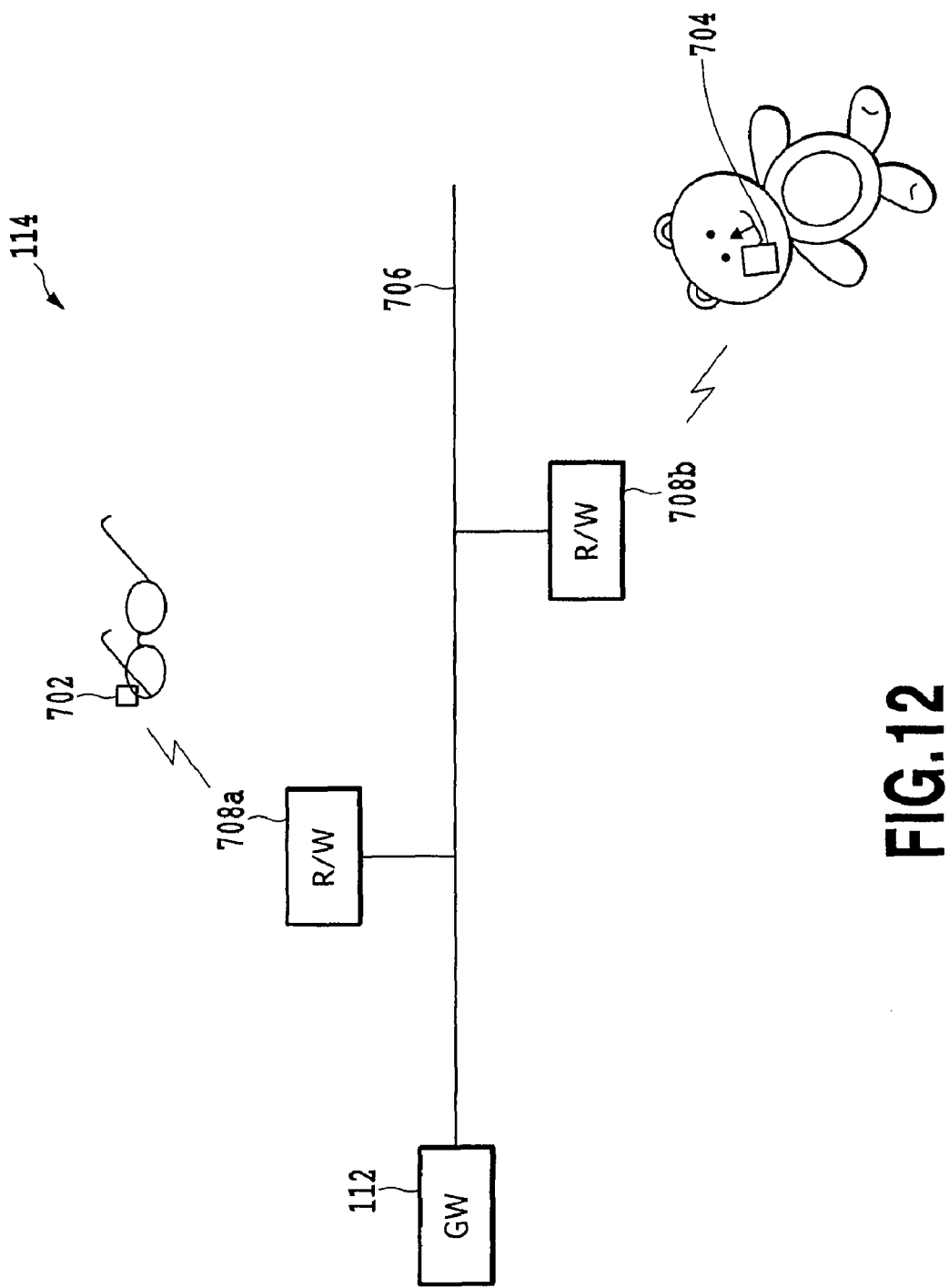
FIG. 12 shows a configuration of a local area network in the search system of one embodiment in accordance with the present invention.

FIG. 12 is a diagram showing a configuration of a local area network in the search system of the present embodiment. The local area network 114 comprises a gateway 112 and reader/writers (R/Ws) 708a and 708b (shortened to "reader/writer 708" from now on) of IC tags, and IC tags 702 and 704 attached to articles. The gateway 112 and R/Ws 708a and 708b conduct communication via a telecommunications line 706. The communication between the R/Ws 708a and 708b and the IC tags 702 and 704 is implemented via a wireless line not shown.

Figure 13:
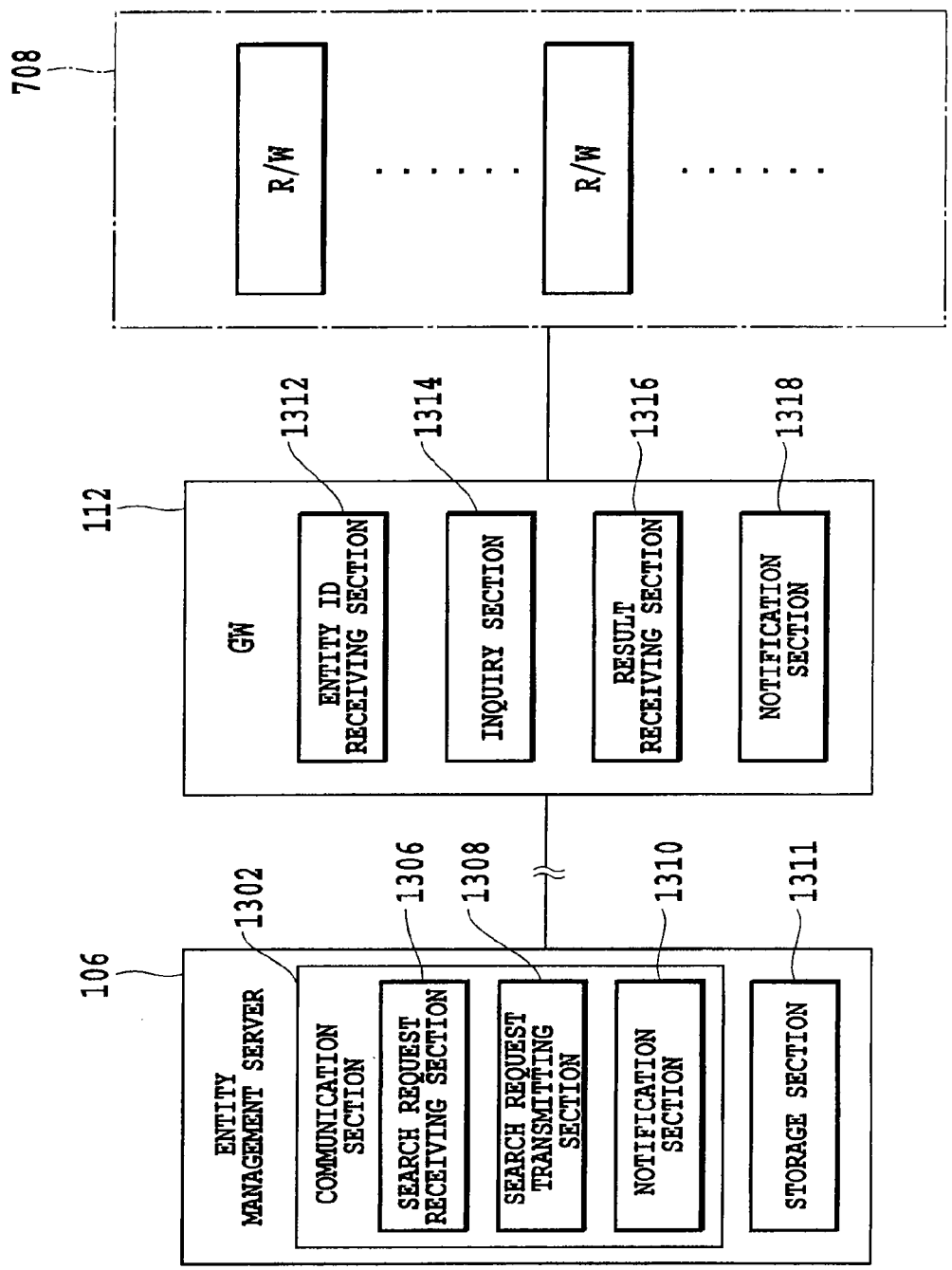
FIG. 13 is a block diagram showing a functional configuration of the entity management server and gateway of an embodiment in accordance with the present invention.

FIG. 13 shows a functional configuration of the search system of the present embodiment.

The entity management server 106 includes a communication section 1302 and storage section 1311. The communication section 1302, which is provided for carrying out communication with the service agent server 104 and gateway 112, includes a search request receiving section 1306, search request transmitting section 1308, and notification section 1310.

The search request receiving section 1306 receives a search request containing information about the entity ID and geographical area from the mobile terminal 102 via the service agent server 104.

The search request transmitting section 1308 transmits the received entity ID to the gateway 112 installed in the geographical area.

The notification section 1310 sends the notification about the location of the gateway 112 to which the search target communications device is connected.

The storage section 1311 stores the gateway IDs and location information items with establishing correspondence between them as shown in the table 502 of FIG. 5.

The gateway 112 includes an entity ID receiving section 1312, inquiry section 1314, result receiving section 1316, and notification section 1318.

The entity ID receiving section 1312 receives an entity ID from the search request transmitting section 1308.

The inquiry section 1314 requests the reader/writers 708 to search for the IC tag that stores the received entity ID.

The result receiving section 1316 receives the result of the inquiry from the reader/writers 708.

The notification section 1318 notifies the entity management server 106 of the result of the inquiry by the inquiry section 1314.

Figure 14:
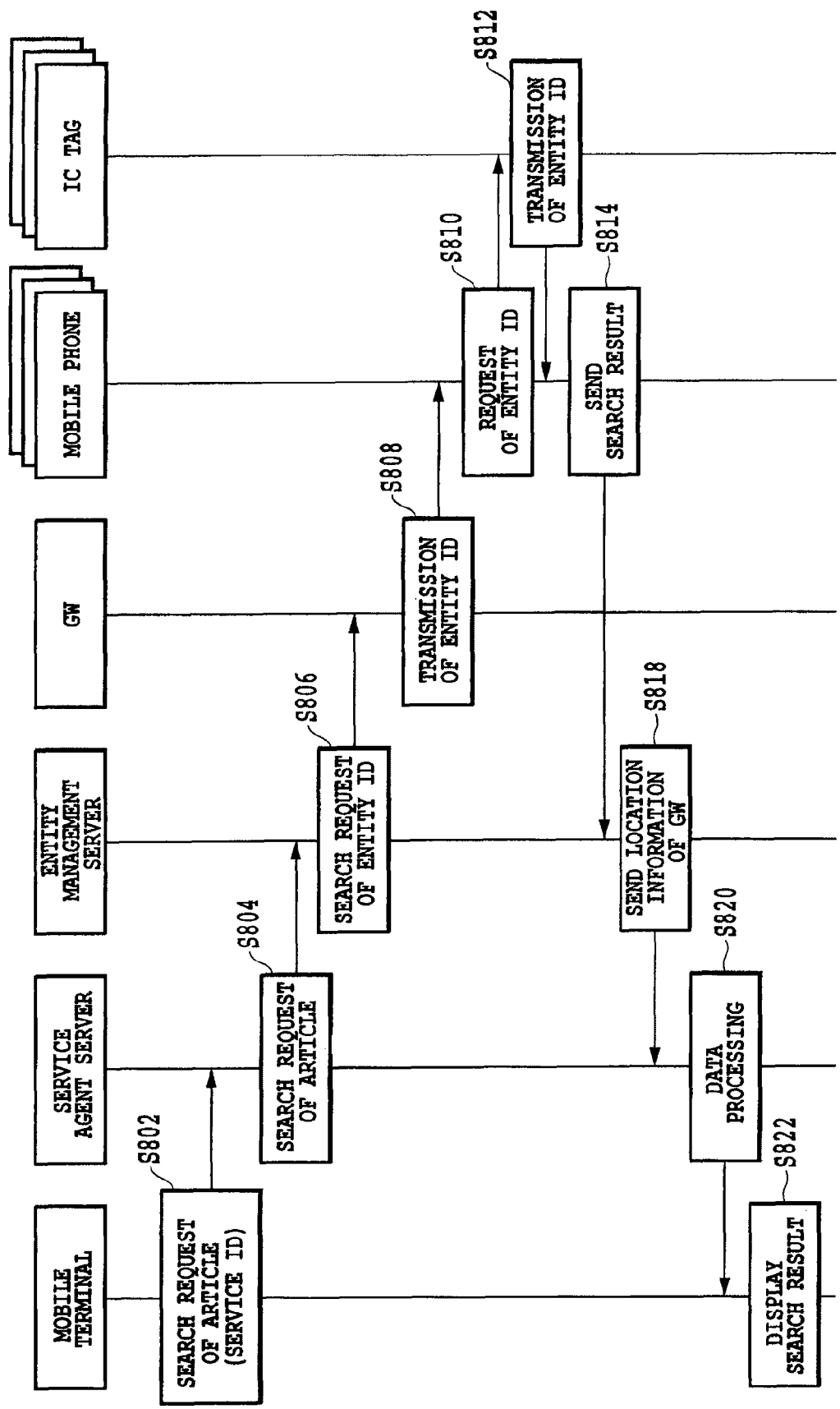
FIG. 14 is a communication sequence chart showing a procedure of a search method of the communications device of one embodiment in accordance with the present invention.

Next, referring to the communication sequence chart of FIG. 14, a procedure of the search method of the communications device of the present embodiment will be described. The present embodiment assumes that the user of the mobile terminal requests the search system to search for the article to which the IC tag is attached. The search system sends the search request to a plurality of mobile phones capable of communicating with the IC tag. In the present embodiment, the mobile phones function as first communications devices, and the IC tags attached to the articles function as second communications devices.

At step S802, the mobile terminal 102 transmits a search request to the service agent server 104. The search request includes the service ID, entity ID, and information about the geographical area in which the search is to be carried out.

At step S804, the service agent server 104 recognizes that the information transmitted from the mobile terminal 102 is the search request of the article from the service ID. Subsequently, the service agent server 104 transmits to the entity management server 106 the information about the entity ID, geographical area and designated time contained in the search request. Thus, the entity management server 106 receives the entity ID, geographical area and designated time transmitted from the terminal via the service agent server 104.

At step S806, referring to the corresponding table as shown in the table 502, the entity management server 106 identifies the location of the gateway 112 group contained in the received geographical area. Then, it transmits the entity ID to the identified gateway 112 group (step S808).

At step S810, the gateway 112 group requests the mobile phone to search for the IC tag storing the received entity ID. The request can be made by E-mail. In response to the received search request, the user of the mobile phone searches for the nearby entity ID with the IC tag using the short-range wireless communication functions of the mobile phone (step S812), and sends the result back to the gateway 112 group (step S814).

Incidentally, the search of the entity ID with the IC tag can be automatically performed by the mobile phone receiving the search request from the gateway 112 group.

At step S814, the gateway 112 group transmits to the entity management server 106 the search result received from the mobile phone.

The entity management server 106 decides from the received search result the gateway connected to the mobile phone that located the IC tag. Subsequently, the entity management server 106 extracts the location information about the gateway 112 group found to which the located communications device is connected, and sends the location information to the service agent server 104 (step S818).

Here, instead of the location information about the gateway 112 group, the gateway ID can be notified.

In addition, it is also possible for the entity management server 106 to send the information about the mobile phone to the service agent server 104. For example, when the entity management server 106 functions as the home location register (HLR), the entity management server 106 can identify the location information about the mobile phone from the information received from the mobile phone, and notify the service agent server 104 of the identified information. Alternatively, the mobile phone can notify the entity management server 106 of the location of the mobile phone itself.

At step S820, the service agent server 104 processes the received location information about the gateway 112 group, and produces the screen data that can be displayed on the mobile terminal. The screen data produced is sent to the mobile terminal 102.

At step S822, the mobile terminal 102 displays the image on the display section in response to the received screen data.

Although the service agent server 104 processes the data in the foregoing example, the entity management server 106 can carry out the processing. In this case, the entity management server 106 can transmit the processed data directly to the mobile terminal 102.

In addition, as in the embodiment 3, it is possible to carry out the search with designating an attribute. In this case, the service agent server 104 stores the information as shown in FIG. 8, and the entity management server 106 stores the information as shown in FIG. 9. Then, when the mobile terminal 102 transmits the search request including the service ID, the service agent server 104 identifies the attribute corresponding to the service ID. The entity management server 106 identifies the entity ID corresponding to the attribute, and notifies the gateway 112 group of the entity ID.

Furthermore, it is also possible to give a reward to the user who located the target object of the search when requesting the users of the mobile phones to search for the article to which the IC tag is attached. It will provide an incentive for the search.

(Embodiment 5)

Next, an embodiment will be described which carries out a search with designating the type of a search target by using the search system of FIG. 1 as the information search system.

Figure 15:
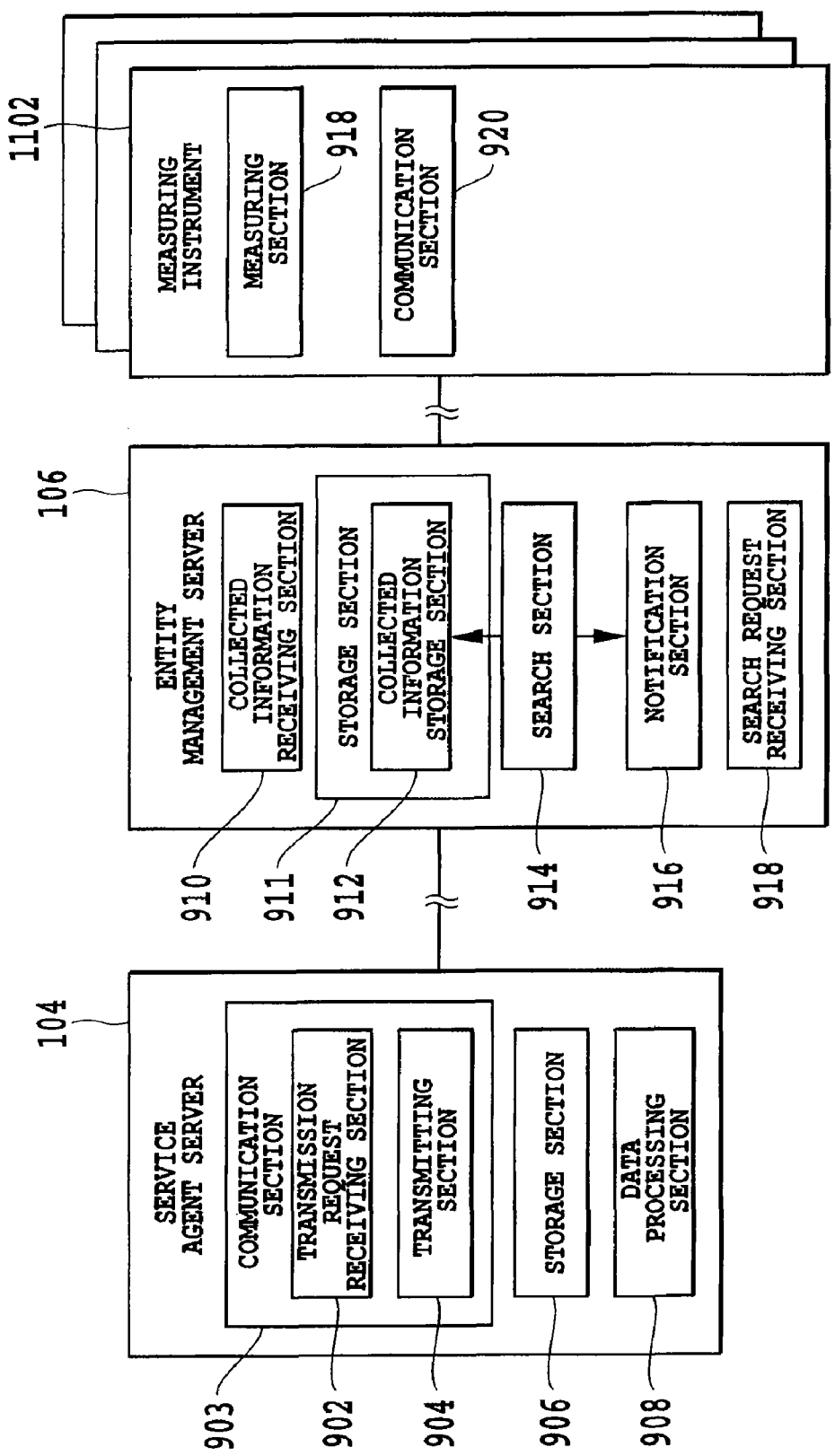
FIG. 15 is a block diagram showing a functional configuration of the service agent server, entity management server and measuring instrument of one embodiment in accordance with the present invention.

FIG. 15 shows a functional configuration of an information collecting instrument connected to the service agent server, entity management server and local area network of the present embodiment.

The service agent server 104 has a communication section 903, storage section 906 and data processing section 908. The communication section 903 includes a transmission request receiving section 902 and transmitting section 904.

The storage section 906 stores the types of services to be offered to the mobile terminal 102 and the attribute information about the information collecting instruments with establishing correspondence between them.

The transmission request receiving section 902 receives from the mobile terminal 102 a transmission request of the information including a desired type of the services.

The transmitting section 904 extracts from the storage section 906 the attribute information corresponding to the type of the service contained in the transmission request, and transmits it to the entity management server 106.

The data processing section 908 processes the information received from the entity management server 106 to produce the image data that can be displayed on the mobile terminal.

The entity management server 106 includes a collected information receiving section 910, storage section 911, search section 914, notification section 916 and search request receiving section 918.

The storage section 911 stores the correspondence between the identification information and location information about the gateway 112 group as shown in the table 502 of FIG. 5, and the correspondence between the entity IDs and attribute information as shown in FIG. 9.

Furthermore, the storage section 911 includes a collected information storage section 912 for storing the entity IDs of measuring instruments 1102 and the collected information transmitted from the measuring instruments 1102 with establishing correspondence between them.

The collected information receiving section 910 receives the collected information from the measuring instruments 1102.

The search section 914 searches the information stored in the collected information storage section 912 to obtain the collected information about the measuring instrument 1102 corresponding to the received entity ID.

The notification section 916 notifies the service agent server 104 of the search result by the search section 914. The search request receiving section 918 is provided for receiving from the mobile terminal 102 the information for requesting the search of the communications device. The information includes the identification information, geographical area of the communications device and designated time.

The measuring instrument 1102, which is an example of the information collecting instrument, includes a measuring section 918 for collecting prescribed measured values, and a communication section 920 for transmitting the measured values and for receiving information. As the measuring instruments 1102, there are such sensors as a thermometer for measuring temperature, a hygrometer for measuring humidity, and a rainfall meter for measuring an amount of rainfall.

FIG. 16 shows an example of the information stored in the service agent server 104 of the present embodiment. As shown in FIG. 16, the storage section 906 of the service agent server 104 stores the service IDs indicating the types of the services, names of information items (necessary information) required for offering the services and attribute information with establishing correspondence between them. The types of the services include weather information service, traffic information service, home condition monitoring, telemetry services and the like. The attribute information represents the names of the measuring instruments such as a thermometer, hygrometer and rainfall meter, or the properties inherent in the measuring instruments such as a color, shape, size, obtainable information contents and operation parameters of the measuring instruments.

Here, it is not always necessary that the necessary information and the attribute information have a one-to-one correspondence. For example, it is possible to associate the necessary information "tide level" with a "tide gauge" for measuring a tide level and a "camera" for conducting a fixed-point observation as the attribute information.

Figure 17:
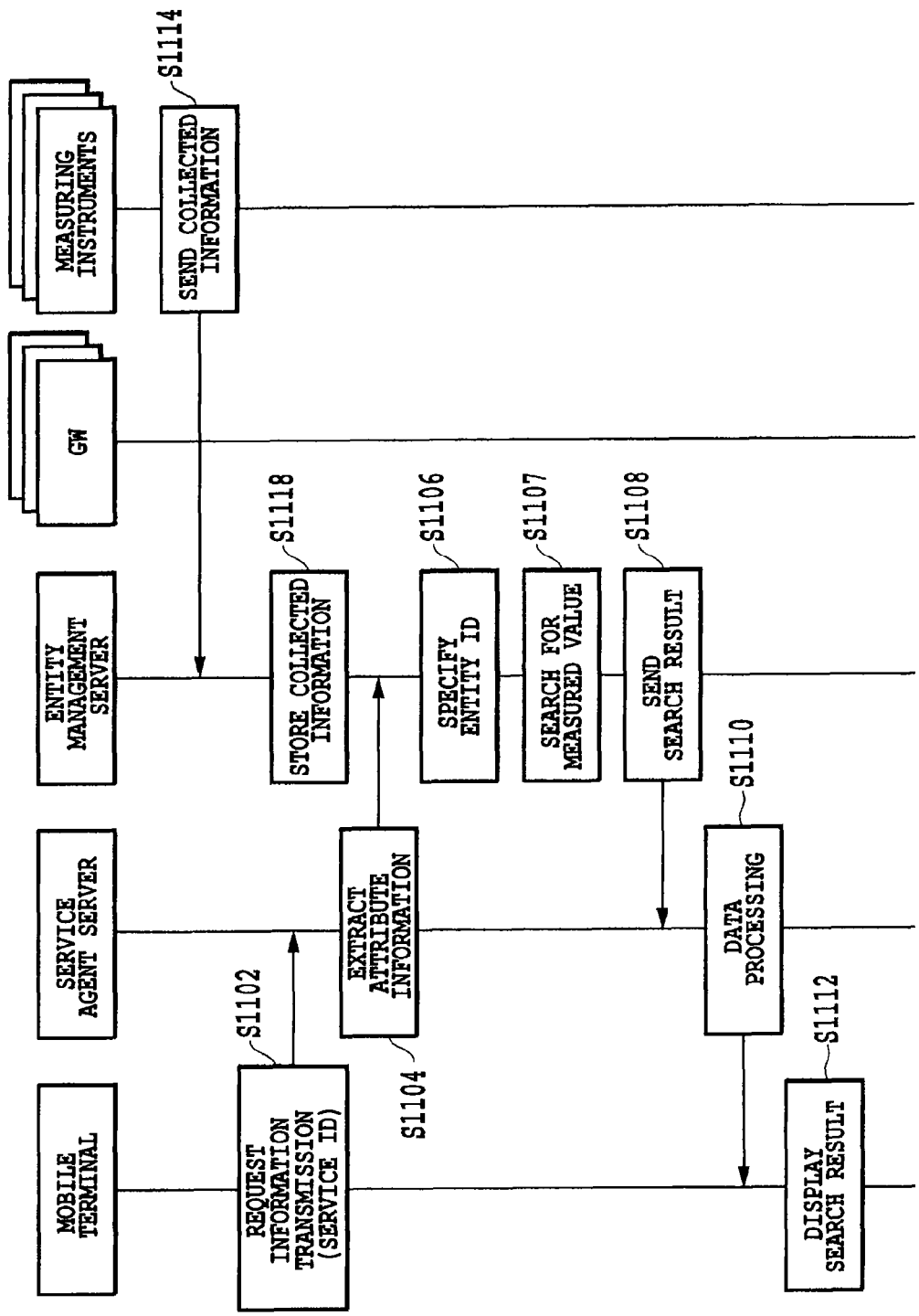
FIG. 17 is a communication sequence chart showing a procedure of an information search method in the search system of one embodiment in accordance with the present invention.

Next, referring to the communication sequence of FIG. 17, the procedure of the information search method of the present embodiment will be described. The present embodiment assumes the case where the user requests a weather information service using the mobile terminal.

The entity management server 106 stores the collected information delivered from the measuring instruments 1102 via the gateway 112 group (steps S1114 and S1118). The collected information delivered in the present embodiment includes the temperature measured by the thermometer, the humidity measured by the hygrometer, the amount of rainfall measured by the rainfall meter, an air contamination level measured by an air sensor, the tide level measured by the tide gauge and the magnitude measured by a seismometer. The measuring instruments 1102 can transmit the collected information at regular intervals, or at a time when the measuring instruments 1102 detect a change in the collected information. Through the processing, the entity management server 106 stores the collected information from the information collecting instruments installed in a plurality of geographical areas.

At step S1102, the mobile terminal 102 transmits a request for a weather information service to the service agent server 104. The request includes information about the service ID, geographical area in which the search is to be carried out, and the designated time of the search.

At step S1104, referring to the cross-reference table as shown in FIG. 16 which is stored in the storage section 906, the service agent server 104 identifies the necessary information from the received service ID, and extracts the attribute information of the measuring instrument that can acquire the information. Subsequently, the service agent server 104 transmits to the entity management server 106 the attribute information extracted, and the information about the geographical area and designated time contained in the request for weather information service.

At step S106, the entity management server 106 identifies the measuring instrument having the received attribute information from the correspondence between the attribute information and entity IDs stored in the storage section 911. Then, it further identifies the measuring instrument in the designated geographical area from the correspondence between the identification information and locations of the gateway 112 group stored in the storage section 911. Thus, it retrieves from the collected information storage section 912 the collected information fed from the identified measuring instrument at the designated time (step S1107).

At step S1108, the collected information retrieved as a result of the search is transmitted to the service agent server 104.

At step S110, the service agent server 104 processes the collected information received from the entity management server 106, and produces the screen data that can be displayed on the mobile terminal. The produced screen data are delivered to the mobile terminal 102.

The processing of the collected information by the service agent server 104 includes averaging and accumulating the collected information from the measuring instrument, or converting the information to be offered to the user, which can be displayed on the mobile terminal 102. For example, the storage section 906 of the service agent server 104 stores, as to the collected information from the measuring instrument, the ranges of the measured values by the rainfall meter (0 millimeter, 1-m millimeters, m+1-n millimeters, . . . ) and the information to be offered to the user (fine, light rain, rain, . . . ) with establishing correspondence between them. At step S1110, the service agent server 104 acquires the information to be offered to the user, which corresponds to the measured values of the rainfall meter received from the entity management server 106, and produces the screen data that can be displayed on the mobile terminal 102 from the information acquired.

The analysis of the collected information carried out during the collected information processing is not limited to that carried out according to the ranges of the measured values, but includes the analysis using equations, or inclination analysis obtained from the time series variations in the collected information. Those skilled in the art will understand that when the information collecting instrument is an image pickup device such as a camera rather than the measuring instrument, the present invention includes the case of grasping changes in an image by analyzing pixels in received data.

At step S1112, the mobile terminal 102 displays an image on the display section according to the received screen data.

Incidentally, when the designated time in the search request transmitted at step S1104 is the present time or future time, the entity management server 106 requests the measuring instruments 1102 at the designated time to transmit the collected information at step S1107. In this case, the entity management server 106 delivers the collected information received from the measuring instruments 1102 to the service agent server 104.

Although the service agent server 104 carries out the data processing in the foregoing example, the entity management server 106 can perform the processing. In this case, the entity management server 106 can transmit the processed data directly to the mobile terminal 102.

As the services capable of offering the information with the same configuration as the present embodiment, the following services are possible: private health information (sphygmomanometers, thermometers, pedometers and the like can be used as the attributes of the information collecting instruments); traffic information (speed sensors and GPS's mounted on a plurality of vehicles can be used as the attributes of the information collecting instruments); telemetering (measuring instruments such as gas meters, water meters and electricity meters can be used as the attributes of the information collecting instruments); and services offering video images and/or pictures of desired spots (image pickup devices such as video cameras and cameras can be used as the attributes of the information collecting instruments).
(Embodiment 6)

It is also possible to have the entity management server 106 manage the collected information, and notify the user when the collected information of the communications device corresponding to the attribute information changes to indicate a predetermined condition.

In this case, when requesting to provide the service, the mobile terminal 102 can also transmit to the entity management server 106 the condition for sending the collected information. For example, in the foregoing example, the mobile terminal 102 transmits to the entity management server 106, together with the home condition monitoring service (service ID: IDd3) request, the instruction to send notification when any value of the measuring instruments indicates abnormality. The entity management server 106 notifies the mobile terminal 102 of the abnormality via the service agent server 104 if any one of the information items collected from the attribute information (electric equipment, an electricity meter, gas meter, door sensor and surveillance camera) corresponding to the service ID=IDd3 becomes abnormal (unlocked, window open, a gas leak is detected while locked or the like).

Such processing makes it possible to notify the user when a locking sensor of doors or windows indicates changes during user's absence.

In addition, such services are also possible as notifying the user if any other condition changes (notifying the mobile terminal 102 if unlocked, interphone rings, window opens, a gas leak is detected while locked or the like).

If the measuring instrument has a failure, the collected information can be error information. In this case, sending the error information from the entity management server 106 to the mobile terminal 102 enables the mobile terminal 102 to keep track of the conditions of the information collecting instrument.

It is also possible for the example of the telemetry service to notify the user of the inventory of a vending machine. Furthermore, an electrical appliance supplier can collect operation conditions of its own articles purchased and distributed to individual homes, thereby enabling maintenance monitoring or obtaining statistical operation information for later development.

As for the notification service of the condition changes of the collected information, it goes without saying that in addition to the search using the attributes, the entity ID of a user's own possession or that of a monitoring target can be designated directly.

Moreover, it is also possible to provide as a matching function of an entity search server a function of computing the distance between communications devices (entity IDs), or the distance between the "entity ID" and the "mobile phone (which sends the location information to the network side)"; to set in advance the distance between an object with a particular attribute/entity ID and the user (mobile phone); and to notify when they approach to (or separate from) each other by a certain distance, or to display the actual position of the communications device. As for the notification of the user's location in this case, it can be implemented by the location registration/location information notification service of the mobile phone, or by the user who becomes the gateway (that notifies the location).
(Embodiment 7)

Figure 18:
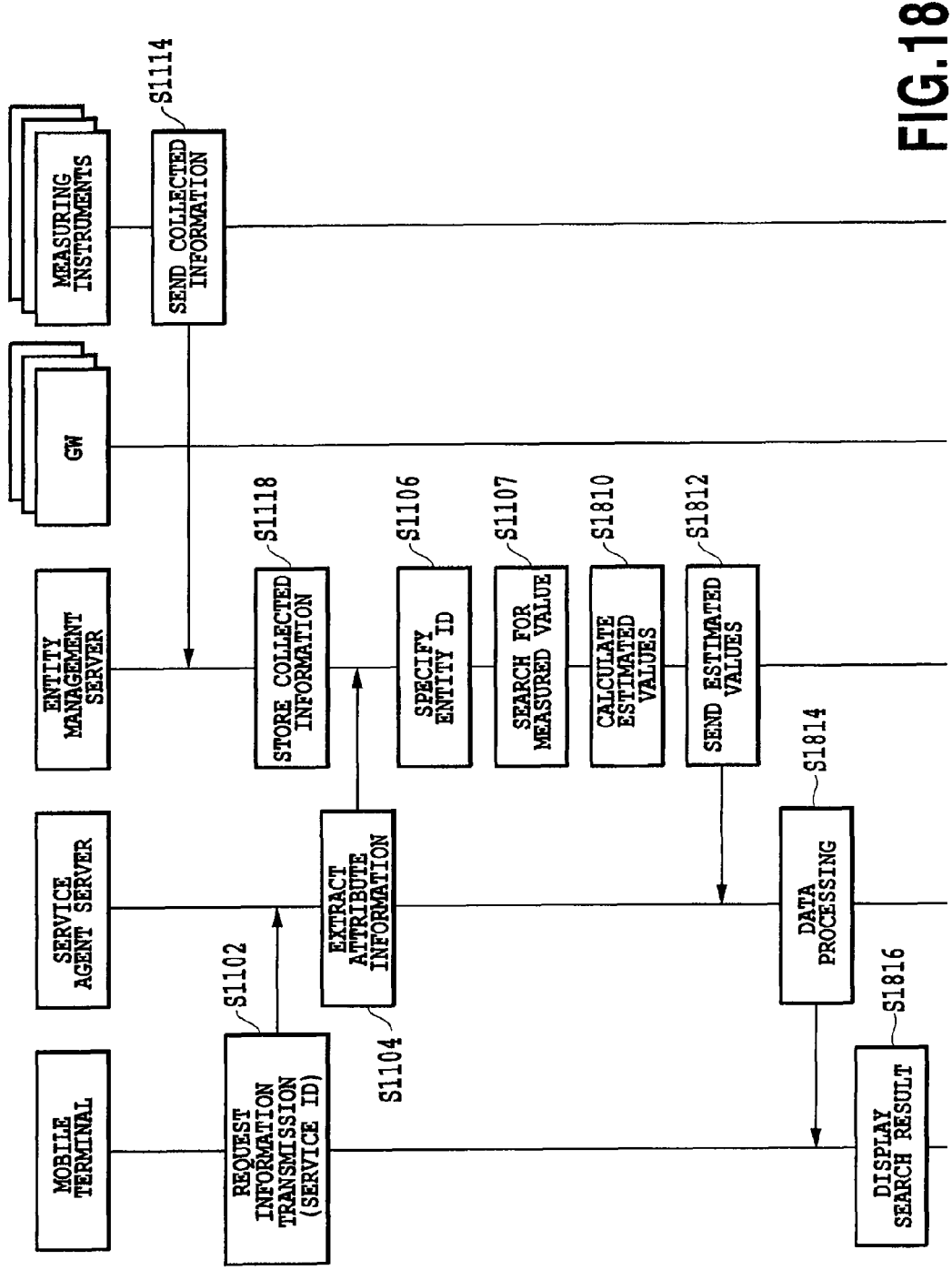
FIG. 18 is a communication sequence chart showing a procedure of an information search method in the search system of one embodiment in accordance with the present invention.

Another service can be implemented which predicts the future according to the past conditions obtained from the necessary information collected from the measuring instruments 1102, and provides to the mobile terminal 102. The processing will now be described with reference to FIG. 18.

For example, at step S1102, the mobile terminal 102 transmits a traffic information service request (service ID=IDd2) to the service agent server 104. The request includes a service ID, geographical area in which the prediction is made, and information about future time for the prediction.

At step S1104, referring to the cross-reference table stored in the storage section 906 and shown in FIG. 16, the service agent server 104 extracts information necessary for the service according to the service ID, and extracts the attribute information about the measuring instrument 1102 capable of acquiring the information. Subsequently, the service agent server 104 transmits to the entity management server 106 the attribute information extracted and the information about the geographical area and designated time contained in the traffic information service request.

At step S1106, the entity management server 106 identifies the measuring instrument having the received attribute information from the correspondence between the attribute information and entity IDs stored in the storage section 911. Then, according to the correspondence between the measuring instruments and locations stored in the storage section 911, or to the correspondence between the identification information and locations of the gateway 112 group, the entity management server 106 further identifies the measuring instruments within the designated geographical area. Subsequently, as for each of the measuring instruments, the entity management server 106 acquires from the collected information storage section 912 the collected information from the measuring instruments at a plurality of past times. Incidentally, when the measuring instrument or gateway moves in/across the geographical area at the time, the entity management server 106 identifies the measuring instruments or gateways within the geographical area at every past time, and acquires the collected information at that time (step S1107). Subsequently, the entity management server 106 obtains a relational expression between the plurality of past times and collected information values. From the relational expression thus obtained, the entity management server 106 estimates the collected information at the future designated time (step S1810).

When the value of the speed sensor is assumed to be a function v(t) of the time in the simplest example of estimating the collected information of the information collecting instrument, the acceleration a(t) of a car can be obtained by the expression a(t)=dv(t)/dt. The speed $v(t_f)$ of the speed sensor at future time $t_f$ can be obtained by the following expression using the measured value $v_0$ of the speed sensor at time $t_0$.

$$v(t_f)=v_0+\int_{t_0}^{t_f}a(t)dt$$

Furthermore, the output values of the speed sensor can also be predicted by learning from extracting past rules such as using the locus of the speed sensor of interest at the same time on the day preceding the day, or the locus of the same day of the week.

Besides, the collected information can be a past designated time rather than a future designated time. Accordingly, it is also possible to estimate the value at the past time at which the measuring instrument did not collect the information actually.

The predicted values of the collected information are transmitted to the service agent server 104 (step S1812).

At step S1814, the service agent server 104 processes the information received from the entity management server 106 and produces the screen data that can be displayed on the mobile terminal. The screen data produced are sent to the mobile terminal 102.

At step S1816, the mobile terminal 102 displays the image on the display section on the basis of the received screen data.
(Embodiment 8)

As one of the services provided to the mobile terminal 102, settings of the operation to the communications device can be included. According to the services of the present embodiment, it is possible to make a request of the communications device to execute a command, or to update a computer program installed in the communications device.

For example, after sending a home service request and identifying various appliances of the user's home, the mobile terminal 102 can request the home electric equipment to execute an operation command via a gateway. As another example, it can request the program update of a consumer electrical appliance. When the entity management server 106 identifies the consumer electrical appliance corresponding to the request information, it can request the consumer electrical appliance to update the computer program via the gateway 112 group.

The update of the computer program can be carried out by storing an update program in the entity management server 106, and by transmitting it to the consumer electrical appliance.

Alternatively, it is also possible to store the update program in the gateway 112 group, and to instruct the gateway 112 group to update the communications device. In this case, the gateway 112 group that receives the instruction transmits the update program of the communications device.

Receiving the operation command, or the update instruction in another example, the communications device carries out its device operation in accordance with the operation command, or updates the installed program by executing the received update program in the another example.

As for the entity IDs or operation commands which are tried out in the network, and the local entity IDs and operation commands which are used in a local environment between communications devices subjected to the gateway, they can conceal or make common the ID management or a variety of protocol types in the local environment in the network side by providing the gateway with an ID conversion function or a protocol (operation command) conversion function.
(Embodiment 9)

In the example of FIG. 5, the entity management server 106 manages only the present location of the gateway group. Accordingly, when the gateway 112 is movable such as a mobile phone, the past location of the gateway 112 is unknown. In other words, the past position of the communications device cannot be known.

In view of this, as a variation of the table 504 in the entity management server 106 shown in FIG. 5, the present embodiment causes the information from the gateway 112 group to include the location of the gateway at the notification time as well, as illustrated in FIG. 19. The entity management server 106 manages the location of the gateway 112 group.

The location information of the gateway 112 group can be acquired in a variety of methods as described below.

For example, when the gateway 112 has a GPS function, the gateway 112 can send the location information identified by the GPS to the entity management server 106.

Alternatively, each gateway 112 can read tag IDs of radio tags distributed fixedly at a plurality of locations, and notify the entity management server 106 of the tag IDs. In this case, the entity management server 106 stores the location of each of the radio tags and the tag IDs with establishing correspondence between them so that it can identify the location of the radio tag corresponding to the tag ID notified. As a result, the location of the gateway 112 group can be identified. Compared with the longitude and latitude information of the GPS, the position identification according to the radio tags is able to provide value-added information such as difference of altitude of the floors in the same building, and presence information (what is a person doing, which passage does the person pass through, what is placed nearby) according to detailed locations such as a lounge, desks in the office, a dining room, particular gates and the like.

When the mobile phone and the gateway 112 are incorporated, or when the mobile phone is connected to the gateway 112, the location registration information of the mobile phone can be used. For example, when the entity management server 106 functions as the home location server (HLR), it can identify the location information of the mobile phone from the information received from the mobile phone.

As for the acquisition of the location information, it is applicable to any cases of the response to the request from the gateway 112 group, the regular notification from the gateway 112 group, and the notification at state changes in the gateway 112 group.

In the present embodiment, the information notification from the gateway 112 group to the entity management server 106, which is described in each embodiment, includes the location information at that time. This makes it possible to identify the past location of the gateway, which is obtained as a result of search in the case where the time is designated at the search request. Referring the information, the entity management server 106 in the foregoing embodiments can identify the past location of the communications device even when the gateway 112 group is traveling.

Making use of this ability, the mobile terminal 102 can transmit the entity ID or service ID with designating a past time range, and the entity management server 106 can acquire a plurality of location information items on the corresponding entity ID in the time range, for example. This enables tracking the "location locus" of the gateway 112 or the entity ID belonging to the gateway 112 at a certain past time range. Thus, the record of the past locations can be searched.

In addition, storing a map image in the service agent server 104 in advance makes it possible to draw on the map image the plurality of location information items obtained from the entity management server 106. In this case, it is also possible to add some processing such as mapping a course passing through a plurality of locations on the map.

Furthermore, it is also possible to estimate the location at a particular time in the time range from the course drawn as described above. At estimating the location, it is also possible to calculate it from the learning from the course information or past course such as roads and railways on the map.

(Embodiment 10)

When the entity management server 106 carries out matching in response to the notification request of the entity ID from the mobile terminal 102, and even if it cannot find the communications device matching the entity ID associated with the search at that time, it can store the entity ID continuously. In this case, the entity management server 106 can carry out further matching after updating the information about the entity ID, or after a predetermined time has elapsed. Thus, it can send the notification to the entity control server 106 or service agent server 104 at the point of finding.

Thus storing the entity ID enables finding the communications device at a time when the gateway 112 passes nearby, even if the target communications device cannot be found at the point of the notification request. In addition, the probability of finding the target communications device can be increased when the gateway 112 stores the entity ID associated with the search instruction and searches for the entity ID on a regular basis, or when the gateway 112 registers the entity ID in the entity management server 106.

(Other Embodiment)

The home location server (HLR) can take charge of part of the functions of the entity management server.

In addition, as the identification information of the entity ID or gateway 112 group, it is possible to use IPv6 address or IPv6 address plus any desired numerical symbol.

Besides, the search request can include a plurality of designated times. For example, the search request can include the start time and end time of the search, which enables the search for the entity ID or information within a certain period.

The service agent server 104 or entity management server 106 can have an interconversion function between a variety of location information items and address information and map information at a time when narrowing down geographical locations or displaying the results. For example, by mapping addresses and the cell IDs of the GPS's, location registration areas of the mobile communication and base stations, it is possible to convert the location information to the address information and map information, and to offer the conversion results to the mobile terminal 102.

Furthermore, the gateway 112 group can be provided with a protocol conversion function. For example, in the example as shown in FIG. 1, the communication between the gateway 112 group and the node 110c is carried out using the normal IP protocol. However, when the gateway 112 is a home gateway, protocols can be used of the industry or consumer electrical appliance suppliers such as ECHONET and HAVi as a communications protocol. Likewise, when the gateway 112 is an RF tag reader, an electromagnetic induction or microwave communication scheme can be employed, and when the gateway 112 is a sensor host, a wired or wireless local communication scheme can be used. The gateway 112 can have a conversion function between the IP protocol on a wide-area network side and a communications protocol on a local (real world) side. FIG. 20 shows relationships between addresses and communications protocols on the network side and communications protocols and IDs on the real world side according to the classification of entities.

Besides, as for the information notification from the gateway 112 or information notification due to a state change or regular information notification in response to the request from the entity management server 106, packet communications charges can be made free. As a means for realizing it, for making the packet free, it is possible to include a particular identifier in a packet sent from the gateway 112, or to make a decision to charge depending on whether the destination address of a packet is the entity management server or not. Usually, the edge node of the network side (corresponding to the node 110c of FIG. 1) makes the charge decision of the packet. The charge decision is possible by checking the address or identifier of the node.

It is also possible to pay a reward for the information notification useful for the reply to the service request. For example, consider the case that provides the user with the traffic information in the example as shown in FIG. 17. In this case, at step S1112, a message for causing the user to reply as to whether the traffic information provided is useful or not is displayed on the mobile terminal 102. The mobile terminal 102 sends back a reply to the message to the entity management server 106 via the service agent server 104. When the reply received indicates "useful", the entity management server 106 identifies the speed sensor that provided the speed information. Thus, the manager of the communications network can pay a reward to the owner of the identified speed sensor.

The reward can also be offered on condition that the matching is achieved as a result of the search using the entity ID. Alternatively, when the gateway 112 makes the matching, the reward can be paid to the owner of the gateway 112 under the condition that the report of the matching result includes a "matched" result.

A variety of variations other than those described above are possible. However, as long as they are based on the technical conception described in the claims, the variations fall within the scope of the present invention.

The invention claimed is:

1. A search system of a communications device having a plurality of first communications devices, a plurality of gateways connected to said first communications devices, said first communications devices being separated from and remotely located from the gateway, and a control server for managing locations of said gateways, said first communications devices being able to communicate with a second communications device provided with identification information, said control server comprising:
- search request receiving means for receiving a search request including the identification information and information about a geographical area; and
- search request transmitting means for transmitting the identification information received to the gateways in the geographical area, and said gateways comprising:
  - inquiring means for requesting said first communications devices to search for the second communications device that stores the identification information received; and
  - inquiring result receiving means for receiving a result of the inquiry from said first communications devices.

2. The search system of the communications device as claimed in claim 1, wherein said second communications device is an IC tag attached to an article, and said first communication device is a mobile terminal having a reader-writer of the IC tag.

3. A search method of a communications device in a search system having a plurality of first communications devices, a plurality of gateways connected to said first communications devices, said first communications devices being separated from and remotely located from the gateway, and a control server for managing locations of said gateways, said first communications devices being able to communicate with a second communications device provided with identification information, said method comprising:
- a step of receiving in said control server a search request including the identification information and information about a geographical area;
- a step of transmitting from said control server the identification information received to the gateways in the geographical area;
- a step of causing said gateways to request said first communications devices to search for the second communications device that stores the identification information received; and
- a step of receiving in the gateways a result of the search from said first communications devices.

4. An information search system having a service agent server for receiving a transmission request of information from a terminal, and a control server for managing information to be provided to said terminal,
said service agent server comprising:
- storing means for storing types of services to be provided to said terminal and attribute information information el.111Ce Ling instruments with establishing correspondence between them;
- transmission request receiving means for receiving the transmission request including a type of service from said terminal; and
- transmitting means for extracting, from said storing means, attribute information corresponding to the type of service included in the transmission request, and for transmitting the attribute information to said control server, and said control server comprising:
  - collected information storing means for storing the attribute information of said information collecting instruments and collected information transmitted from said information collecting instruments in correspondence with each other; and
  - search means for retrieving the collected information corresponding to the received attribute information by searching said collected information storing means.

5. The information search system as claimed in claim 4, further comprising gateways for mediating communication between said information collecting instruments and said control server, wherein said collected information storing means stores locations of the gateways as the locations of said information collecting instruments.

6. The information search system as claimed in claim 4, wherein
- the collected information storing means further stores locations of said information collecting instruments in correspondence with the attribute information of said information collecting instruments and the collected information, and
- said search request receiving means farther receives information about a geographical area from said terminal; said transmitting means further transmits the information about the geographical area; and said search means acquires information collected by said information collecting instruments included in the geographical area received.

7. The information search system as claimed in claim 4, wherein
- said search request receiving means further receives information about a designated instantaneous point in time from said terminal; and said search means acquires collected information at the designated instantaneous point in time.

8. The information search system as claimed in claim 4, wherein
- said control server further comprises notification means for notifying said service agent server of the collected information acquired by said search means; and
- said service agent server further comprises processing means for processing the collected information sent from said notification means into offering information to be provided to said terminal.

9. The information search system as claimed in claim 8, wherein
- said storing means stores the collected information and the offering information with establishing correspondence between them; and said processing means retrieves from said storing means the offering information corresponding to the collected information sent by said notification means.

10. The information search system as claimed in claim 4, wherein
- said control server further comprises notification means for sending a notification to said service agent server when the collected information retrieved by said search means meets a prescribed condition.

11. The information search system as claimed in claim 4, further comprising setting means for setting operating conditions of the information collecting instruments corresponding to the search request.

12. The information search system as claimed in claim 4, wherein
- said search means retrieves a plurality of collected information items transmitted from one of said information collecting instruments in the past; and wherein said information search system further comprises:
- estimating means for estimating, from the plurality of collected information items, the collected information to be transmitted from one of said information collecting instruments at a designated instantaneous point in time.

13. An information search method in an information search system having a service agent server for receiving a transmission request of information from a terminal, and a control server for managing information to be provided to said terminal, said service agent server having storing means for storing types of services to be provided to said terminal and attribute information of information collecting instruments with establishing correspondence between them, said control server having collected information storing means for storing identification information of said information collecting instruments and the collected information transmitted from said information collecting instruments in correspondence with each other, said information search method comprising:

a step of receiving, in said service agent server, the transmission request including a type of service from said terminal;

a step of extracting, in said service agent server, the attribute information corresponding to the type of service included in the transmission request from said storing means, and of transmitting the attribute information to said control server; and a step of retrieving, in said control server, collected information of the information collecting instruments corresponding to the received attribute information by searching said collected information storing means.

* * * * *